United States Patent [19]

Murayama et al.

[11] Patent Number: 4,921,770
[45] Date of Patent: May 1, 1990

[54] PHOTORECEPTOR FOR ELECTROPHOTOGRAPHY

[76] Inventors: Tetsuo Murayama, 8-15 Tamagawa-Gakuen; Shinji Aramaki, 10-201 Popuragaoka-Koopu, 2-10-1 Naruse, both of Machida-shi, Tokyo, Japan

[21] Appl. No.: 228,684

[22] Filed: Aug. 4, 1988

[51] Int. Cl.$^5$ .............................................. G03G 5/06
[52] U.S. Cl. ....................................... 430/76; 430/77; 430/78
[58] Field of Search ....................... 430/59, 72, 73, 74, 430/76, 77, 78

[56] References Cited

U.S. PATENT DOCUMENTS

| | | | |
|---|---|---|---|
| 4,618,555 | 10/1986 | Suzuki et al. | 534/752 X |
| 4,737,430 | 4/1988 | Kinoshita et al. | 430/74 |
| 4,760,003 | 7/1988 | Matsumoto et al. | 430/73 |
| 4,791,194 | 12/1988 | Suzuki et al. | 430/78 |
| 4,792,982 | 10/1987 | Matsumoto et al. | 430/72 |

FOREIGN PATENT DOCUMENTS 0063387 10/1982 European Pat. Off.

OTHER PUBLICATIONS

T. Murayama, Patent Abstracts of Japan 9, No. 273 (P-401) 1966.
T. Suzuki, Patent Abstracts of Japan 11, No. 303 (P-622) [2750].

Primary Examiner—John L. Goodrow
Attorney, Agent, or Firm—David G. Conlin; Ronald I. Eisenstein; Patricia A. McDaniels

[57] ABSTRACT

Disclosed herein is a photoreceptor for electrophotography comprising a conductive substrate and a photosensitive layer thereon containing an azo compound represented by the formula (I):

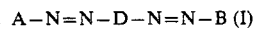

wherein A represents a coupling component derived from the following formula (II):

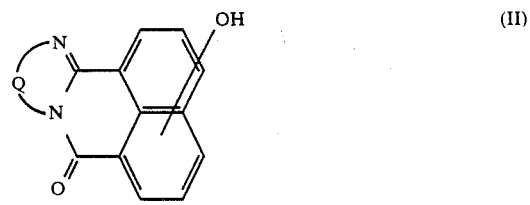

wherein Q represents a divalent group derived from an aromatic hydrocarbon which may have one or more substituents or a divalent group derived from a heterocyclic compound which may have one or more substituents, B represents a different coupling component having a phenolic hydroxyl group from said A, and D represents a divalent group in which the carbon atoms bonded to the azo groups are $SP^2$ carbon atoms forming double bonds.

4 Claims, 8 Drawing Sheets

PHOTORECEPTOR FOR ELECTROPHOTOGRAPHY

BACKGROUND OF THE INVENTION

The present invention relates to a photoreceptor for electrophotographic, more particularly to a high-sensitive photoreceptor for electrophotography containing a novel azo compound.

Photoreceptor using inorganic photoconductors such as selenium, cadmium sulfide, zinc oxide and the like have been employed in electrophotography. Recently, however, the photoreceptor using organic photoconductors (OPC), or so-called organic photoreceptors have come to be employed for PPC and printers because of many advantages of OPC such as having no pollution problem, easiness of production and handling, capability of forming high-quality pictures and easy preparation into photoreceptor in various forms such as drum, sheet, belt, etc., and the demand for such organic photoreceptor is increasing every year. Organic photoreceptors have indeed many advantages over the conventional inorganic type photoreceptors but they are still inferior to the conventional photoreceptors in sensitivity and durability and therefore at present mainly used for low-speed devices.

Many attempts have been made for improving the sensitivity and durability of organic photoreceptors.

The first commercially available organic photoreceptor was the one making use of the sensitizing action of a charge-transfer complex comprising a mixture of polyvinyl carbazole (PVK) and 2,4,7-trinitrofluorenone (TNF) which is an electron attractive compound.

This has initiated the development of many charge-transfer complex type organic photoreceptors, but there is yet available none which excels said PVK-TNF type photo-receptors in performance.

The organic photoreceptors which are popularly used in the art at present are the so-called function-separated type in which the function of generating the charge carrier and the function of transporting it are separatively performed by the different compounds.

The function-separated type photoreceptors have the merits that it is possible to combine a compound with high efficiency in generating charge carrier and a compound with high transport efficiency, and also the range of choice is wide for materials with excellent durability, so that there can be obtained a photoreceptor having high sensitivity and excellent durability.

There are two types of function-separated type photoreceptor: layered type in which the carrier generating material and the carrier transport material form separate layers and laminated, and single layer type in which said both materials are contained in a same sensitive layer. In both types, there proceeds in the medium the process of generating a carrier in the carrier generating material as it absorbs light, injection the generated carrier into the carrier transport material and transport the carrier between the molecules of said carrier transport material. Therefore, the sensitivity of the photoreceptor depends on the carrier generation efficiency, injection efficiency and transport efficiency, so that there is selected a combination of a carrier generating material with high carrier generation efficiency and a carrier transport material with high carrier transport efficiency and the combination with high carrier injection efficiency.

Various types of photoconductive pigments have been developed as carrier generating material. Especially azo-pigments have been studied preferentially as carrier generating material for PPC as they have high sensitivity and are also excellent in spectral sensitivity as compared with other types of pigments, and some of such azo-pigments have been used practically.

However, the conventional azo-pigments are still unsatisfactory in durability as they exhibit large light-fatigue.

The object of the present invention is to provide a photoreceptor improved in sensitivity and durability, both of which are unsatisfactory in the conventional organic photoreceptors. It is particularly envisaged in this invention to provide an organic photoreceptor which is high in sensitivity, highly resistant to light-fatigue, minimized in reduction of electrostatic properties after repeated use and excellent in durability.

Concerning azo-pigments used as carrier generating material, bis-azo pigments with "Naphthol AS" type coupling component have been studied and reported in many literatures, for instance, Japanese Patent Application Laid-Open (KOKAI) No. 47-37543. The azo-pigments with this type coupling component, however, have defects that they show large light-fatigue and also poor durability for electrostatic properties.

As a result of extensive researches on finding novel azo compounds usable as a carrier generating material for obtaining a photoreceptor for electrophotography with high sensitivity and durability, the present inventors found that certain specific coupler-asymmetric bis-azo compounds are suited for the purpose and accomplished the present invention based on this finding.

SUMMARY OF THE INVENTION

In an aspect of the present invention, there is provided a photoreceptor for electrophotography comprising a conductive substrate and a photosensitive layer thereon containing an azo compound represented by the formula (I):

$$A-N=N-D-N=N-B \qquad (I)$$

wherein A represents a coupling component derived from the following formula (II):

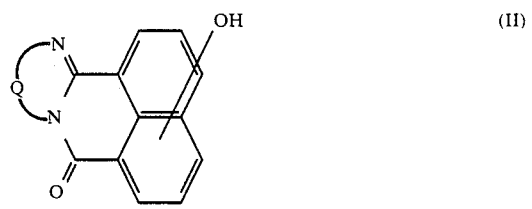

wherein Q represents a divalent group derived from an aromatic hydrocarbon which may have one or more substituents or a divalent group derived from a heterocyclic compound which may have one or more substituents, B represents a different coupling component having a phenolic hydroxyl group from said A, and D represents a divalent group in which the carbon atoms bonded to the azo groups are $SP^2$ carbon atoms forming double bonds.

Figure 1:
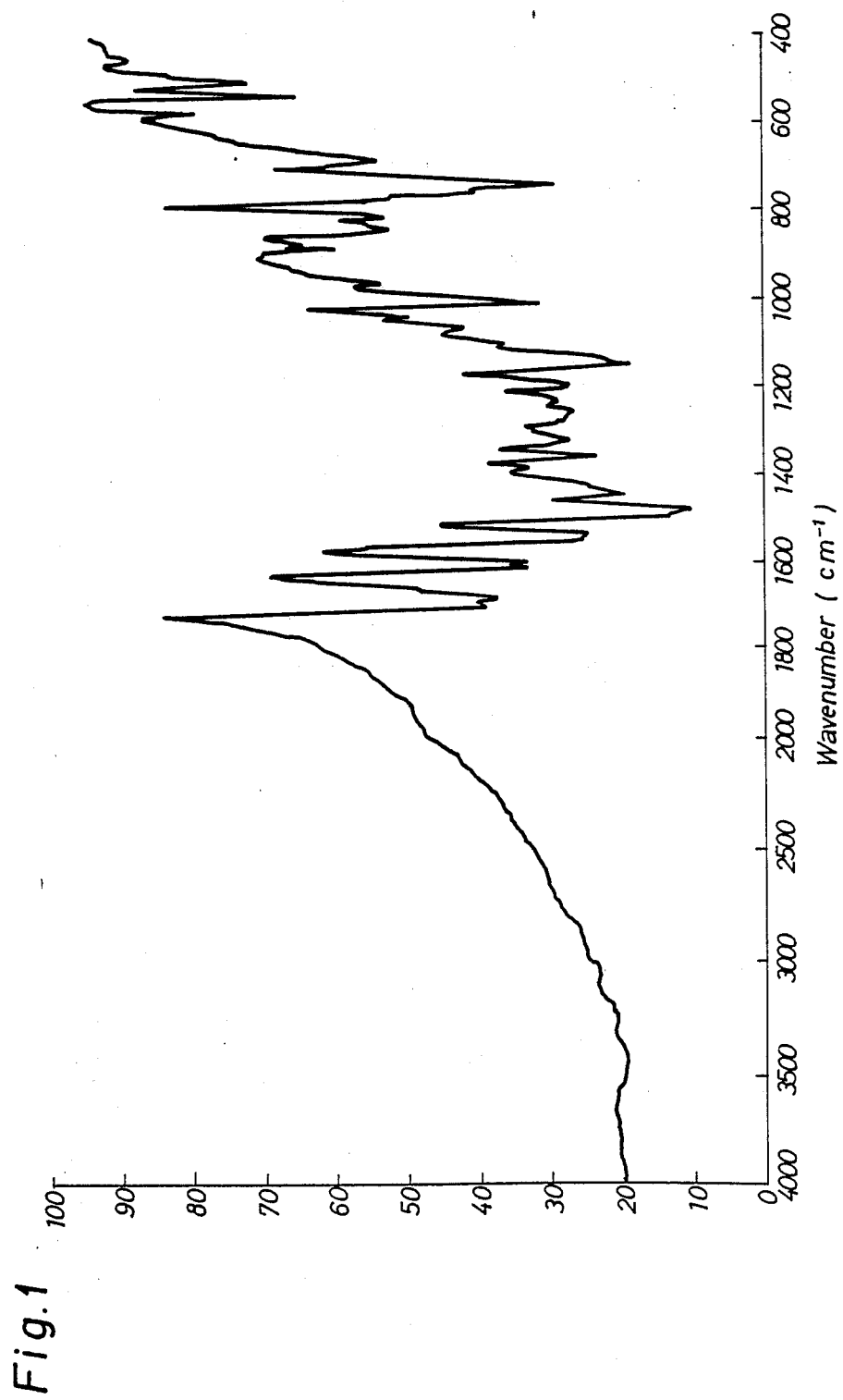
FIGS. 1 to 4 are the absorption spectra of the azo compounds obtained in Preparation Example 1.

DETAILED DESCRIPTION OF THE INVENTION:

The present invention relates to a photoreceptor for electrophotography comprising a conductive substrate and a photosensitive layer thereon containing an azo compound represented by the formula (I):

A—N=N—D—N=N—B     (I)

wherein A represents a coupling component derived from the following formula (II):

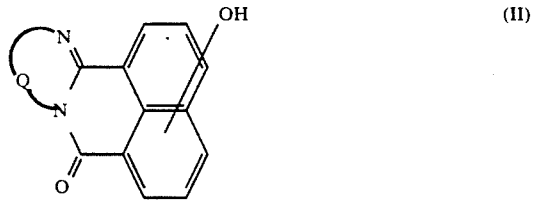

wherein Q represents a divalent group of an aromatic hydrocarbon which may have one or more substituents or a divalent group of a heterocyclic ring which may have one or more substituents, B represents a different coupling component having a phenolic hydroxyl group from the A, and D represents a divalent group in which the carbon atom bonded to the azo group is an $SP^2$ carbon atom forming a double bond.

The azo compounds according to the present invention are described in detail below.

In the formula (I) shown above, A and B bonded to the azo groups represent the coupling components which are different from each other. A represents a coupling component derived from the formula (II) bonded to an azo group by a coupling reaction with a diazonium salt. In the formula (II), Q represents a divalent group of an aromatic hydrocarbon which may have one or more substituents or a divalent group of a heterocyclic ring which may have one or more substituent.

Typical examples of said divalent group of aromatic hydrocarbon are the divalent groups of monocyclic aromatic hydrocarbons such as o-phenylene group, and divalent groups of condensed polycyclic aromatic hydrocarbons such as o-naphthylene group, 1,8-naphthylene group, 1,2-anthraquinonylene group, and 9,10-phenanthrylene group.

Examples of said divalent group of heterocyclic ring are 3,4-pyrazolediyl group, 2,3-pyridinediyl group, 3,4-pyridinediyl group, 4,5-pyrimidinediyl group, 6,7-indazolediyl group, 5,6-benzimidazolediyl group, and 5,6-quinolinediyl group.

In the present invention, these divalent groups of aromatic hydrocarbons and heterocyclic rings may have one or more substituent. Examples of such substituent are $C_1$-alkyl groups such as methyl, ethyl, n-propyl, isopropyl, n-butyl, i-butyl and n-hexyl; trifluoromethyl group; $C_1$-alkoxy groups such as methoxy, ethoxy, propoxy and butoxy; hydroxyl group; nitro group; cyano group; amino group; substituted amino groups such as dimethylamino, diethylamino and dibenzylamino group; halogen atoms such as fluorine, chlorine, bromine and iodine; carboxyl group; $C_1$-alkoxycarbonyl groups such as ethoxycarbonyl; carbamoyl group; acyl groups such as acetyl and benzoyl; aryloxy groups such as phenoxy; arylalkoxy groups such as benzyloxy; and aryloxycarbonyl groups such as phenyloxycarbonyl. Among these groups, alkyl groups, alkoxy groups, nitro group, halogen atoms, hydroxyl groups and carbamoyl group are preferred. Among them, methyl group, methoxy group, nitro group, chlorine atom and hydroxyl group and especially preferred.

B represents a different coupling component having a phenolic hydroxyl group from the A. Any of the couplers which cause a coupling reaction with diazonium salt is usable.

The "phenolic hydroxyl group" means a hydroxyl group substituted on an aromatic hydrocarbon ring. An aliphatic hydrocarbon ring or a heterocyclic ring may be further condensed to said aromatic hydrocarbon ring.

As B, there can be used a coupling component derived from the formula (II) but different from A, but it is preferred to use a coupling component derived from the following formulae (IV-a) to (IV-i):

(IV-a)

wherein $Y_1$ and $Y_2$ represent independently hydrogen atom, halogen atom, alkyl group which may have a substituent, aryl group, heterocyclic group, alkoxy group, aryloxy group, aralkyloxy group, carboxyl group, alkoxycarbonyl group, aryloxycarbonyl group, substituted or non-substituted carbamoyl group, substituted or non-substituted hydrazinocarbonyl group, acyl group or acylamino group;

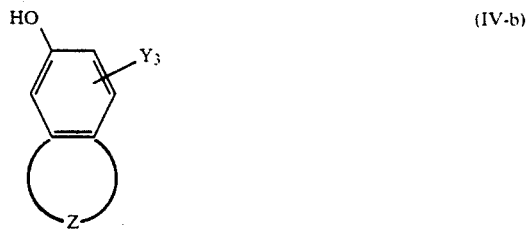

(IV-b)

wherein $Y_3$ represents hydrogen atom, halogen atom, alkyl group which may have a substituent, aryl group, hetero-cyclic group, alkoxy group, aryloxy group, aralkyloxy group, carboxyl group, alkoxycarbonyl group, aryloxycarbonyl group or acyl group, and Z represents a divalent group forming an aromatic hydrocarbon ring or heterocyclic ring by condensing wity the benzene ring;

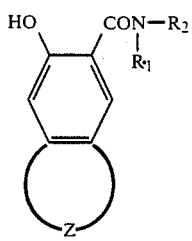
(IV-c)

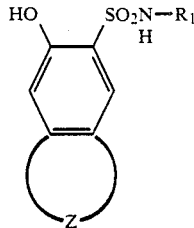
(IV-g)

wherein $R_1$ and $R_2$ represent independently hydrogen atom, lower alkyl group which may have a substituent, aryl group or heterocyclic group, and $R_1$ and $R_2$ may be bonded each other to form a ring, and Z represents the same as defined above in relation to the formula (IV-b);

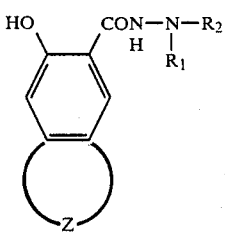
(IV-d)

wherein $R_1$ and Z represent the same as defined above in relation to the formulae (IV-c) and (IV-b);

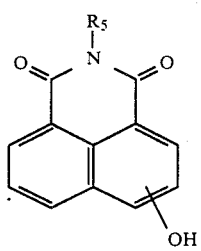
(IV-h)

wherein $R_1$, $R_2$ and Z are as defined above in relation to the furmula (IV-c);

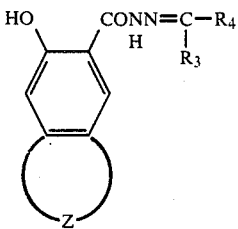
(IV-e)

wherein $R_5$ represents alkyl group which may have a substituent, alkenyl group which may have a substituent, alkynyl group which may have a substituent, or aryl group;

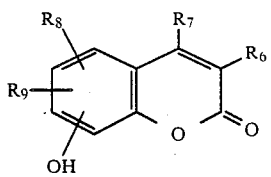
(IV-i)

wherein $R_3$ and $R_4$ represent independently hydrogen atom, alkyl group which may have a substituent, alkenyl group which may have a substituent, alkynyl group which may have a substituent, aryl group, heterocyclic group, vinyl group which may have a substituent or butadienyl group which may have a substituent, and $R_3$ and $R_4$ may be bonded each other to form a ring, and Z is as defined above in relation to the formula (IV-b);

wherein $R_6$, $R_7$, $R_8$ and $R_9$ represent independently hydrogen atom, halogen atom, alkyl group which may have a substituent, vinyl group which may have a substituent, substituted amino group or aryl group, and $R_6$ may represent, beside the above, $$-\underset{\underset{O}{\|}}{C}-R_{10}$$

wherein $R_{10}$ represents alkyl group which may have a substituent, aryl group, heterocyclic group, vinyl group which may have a substituent, amino group which may have a substituent or alkoxy group which may have a substituent.

Examples of the substituents in the above formulae (IV-a) to (IV-i) are shown below.

Examples of the halogen atom are fluorine atom, chlorine atom, bromine atom and iodine atom. Examples of the alkyl group which may have a substituent are methyl, ethyl, n-propyl, n-butyl, isobutyl, tert-butyl, n-hexyl, n-octyl, benzyl, p-methylbenzyl, p-chlorobenzyl, 2-phenylethyl, 1-naphthylmethyl, 2-naphthylmethyl, allyl, 2-hydroxyethyl, 2-methoxyethyl, 3-morphorinopropyl, 2-diethylaminoethyl and 3-carbazorylmethyl. Among them, the lower alkyl groups are the alkyl groups having 1 to 6 carbon atoms.

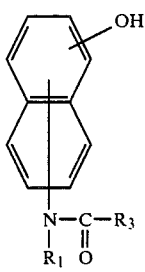
(IV-f)

wherein $R_1$ and $R_3$ represent the same as defined above in relation to the formulae (IV-c) and (IV-e);

Examples of the aryl group are aromatic hydrocarbon groups such as phenyl, naphthyl, anthryl, pyrenyl, phenanthryl, anthraquinoryl, acenaphthyl, fluorenyl, biphenylyl, p-terphenylyl and p-styrylphenyryl. As the substituents therefore, there can be mentioned alkyl groups such as methyl, ethyl and butyl; halogen atoms such as fluorine, chlorine, bromine and iodine; alkoxy groups such as methoxy, ethoxy and butoxy; aryloxy groups such as phenoxy; hydroxyl group; nitro group; cyano group; amino group; substituted amino groups such as dimethylamino, diethylsubstituted amino groups such as dimethylamino, diethylamino and dibenzylamino group; carboxyl group; alkoxycarbonyl groups such as ethoxycarbonyl; aryloxycarbonyl groups such as phenyloxycarbonyl; acyloxy groups such as acetoxy and benzoyloxy; acyl groups such as acetyl and benzoyl; substituted aminocarbonyl groups such as carbamoyl, dimethylaminocarbonyl and phenylaminocarbonyl; and arylalkoxy groups such as benzyloxy and phenetyloxy.

Examples of the heterocyclic group are furyl, thienyl, thiazolyl, indolyl, pyrrolyl, carbazolyl, pyridyl, morpholino, quinolyl, imidazolyl, oxazolyl, triazolyl, piperidyl, benzoxazolyl, benzimdazolyl, benzthiazolyl, acridyl, xanthenyl, phenazinyl, phenothiazinyl and coumarinyl. These heterocyclic groups may have the same substituents as those of the aryl groups mentioned above.

Methoxy and ethoxy can be mentioned as examples of the alkoxy group, phenoxy, p-chlorophenoxy, p-methylphenoxy and 1-naphthoxy as examples of the aryloxy group, and benzyloxy and phenetyloxy as examples of the aralkyloxy group.

Methoxycarbonyl and ethoxycarbonyl can be mentioned as examples of the alkoxycarbonyl group, and phenoxycarbonyl and 1-naphthoxycarbonyl as examples of the aryloxycarbonyl group.

Z represents a divalent group forming an aromatic hydrocarbon ring or a heterocyclic ring such as naphthalene ring, anthracene ring, carbazole ring, benzocarbazole ring or dibenzofuran ring by being condensed with a benzene ring.

Examples of the groups represented by $R_1$ and $R_2$, those which are bonded each other to form a ring are cyclohexylidene, indenylidene, fluorenylidene and pentamethylene.

Examples of the alkenyl group are allyl, 3-butenyl and cinnamyl.

The structural formulae of the examples of the couplers represented by the above-described formula (II) and (IV-a) to (IV-i) are shown in Tables 1 and 2 below. Needless to say, the compounds of this invention are not limited to these examples.

TABLE 1

(Examples of A)

No.  Structural formula

A-1
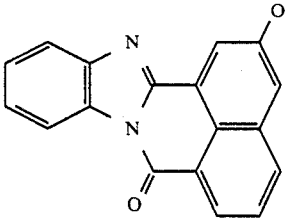 and 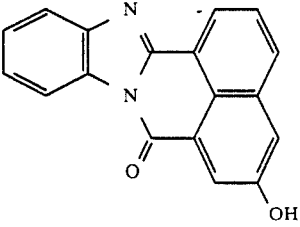

A-2
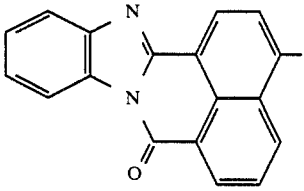 and 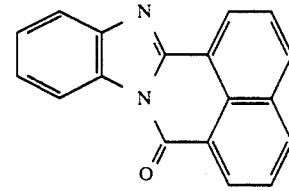

A-3
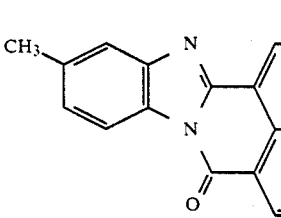 and 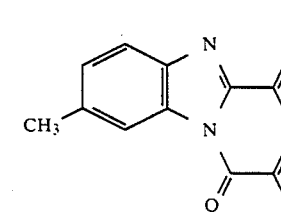

A-4
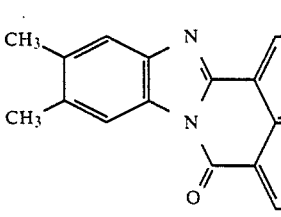 and 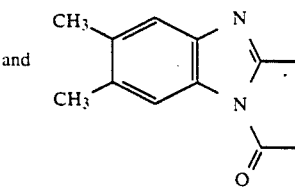

TABLE 1-continued
(Examples of A)
| No. | Structural formula |
|---|---|
| A-5 | 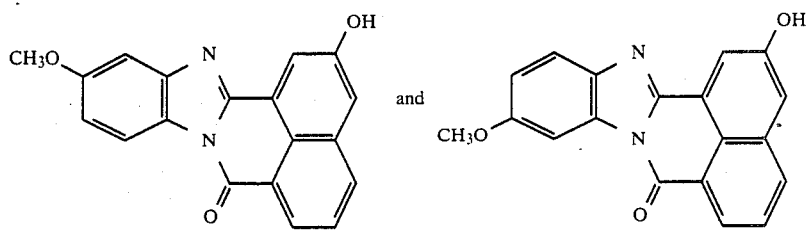 and |
| A-6 | 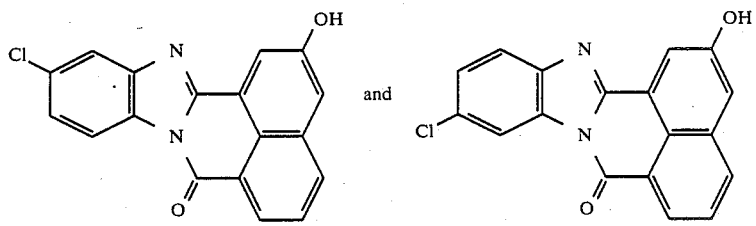 and |
| A-7 | 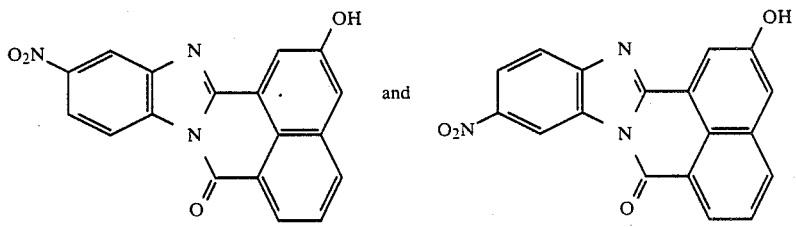 and |
| A-8 | 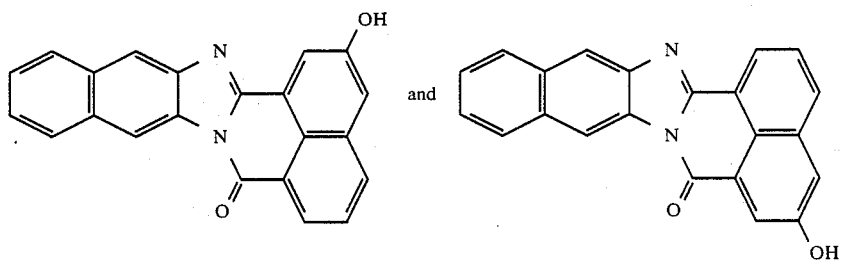 and |
| A-9 | 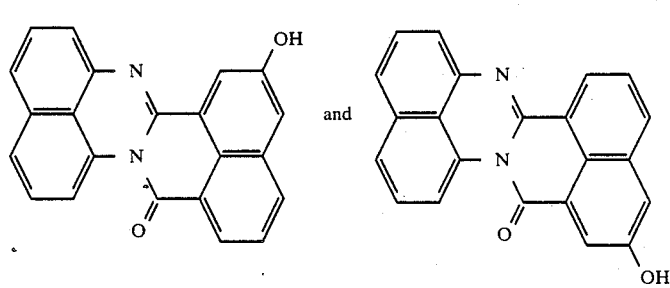 |
| A-10 | 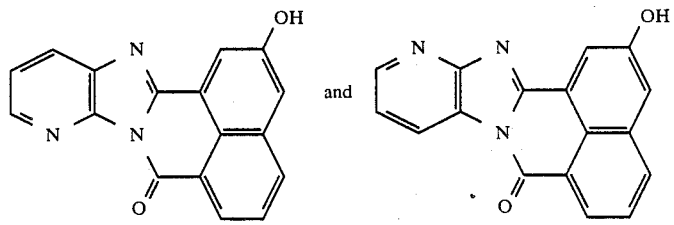 and |

TABLE 1-continued
(Examples of A)
| No. | Structural formula |
|---|---|
| A-11 | 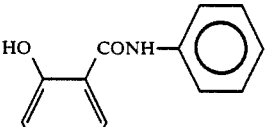 |
| A-12 | 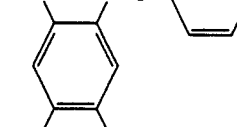 |
| A-13 | 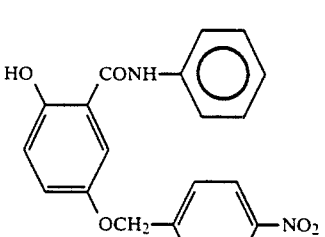 |
TABLE 2
(Examples of B)
| No. | Structural formula |
|---|---|
| B-1 | 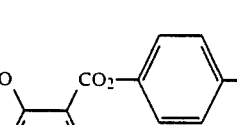 |
| B-2 | 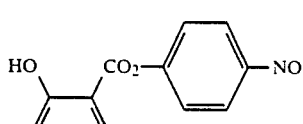 |
| B-3 | 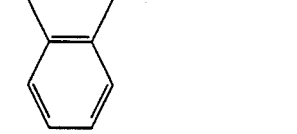 |
| B-4 | |

TABLE 2-continued (Examples of B)

| No. | Structural formula |
|---|---|
| B-5 | 3-hydroxy-2-naphthoic acid 4-methoxyphenyl ester |
| B-6 | ethyl 3-hydroxy-2-naphthoate |
| B-7 | 2-(3-hydroxy-2-naphthyl)benzoxazole |
| B-8 | 2-(3-hydroxy-2-naphthyl)benzothiazole |
| B-9 | 3-hydroxy-2-anthracenecarboxylic acid 4-chlorophenyl ester |
| B-10 | phenyl 3-hydroxy-5-(2-phenylamino)-2-naphthoate |
| B-11 | 3-hydroxy-N-methyl-2-naphthamide |
| B-12 | 3-hydroxy-N-phenyl-2-naphthamide |
| B-13 | 3-hydroxy-N-(2-methylphenyl)-2-naphthamide |
| B-14 | 3-hydroxy-N-(4-methylphenyl)-2-naphthamide |

TABLE 2-continued

| No. | (Examples of B) Structural formula |
|---|---|
| B-15 | 3-hydroxy-N-(2-methoxyphenyl)-2-naphthamide |
| B-16 | 3-hydroxy-N-(4-methoxyphenyl)-2-naphthamide |
| B-17 | 3-hydroxy-N-(4-chlorophenyl)-2-naphthamide |
| B-18 | 3-hydroxy-N-(2-chlorophenyl)-2-naphthamide |
| B-19 | 3-hydroxy-N-(4-chloro-2-methylphenyl)-2-naphthamide |
| B-20 | 3-hydroxy-N-(2,4-dimethoxyphenyl)-2-naphthamide |
| B-21 | 3-hydroxy-N-(3-nitrophenyl)-2-naphthamide |
| B-22 | 3-hydroxy-N-(4-nitrophenyl)-2-naphthamide |
| B-23 | 3-hydroxy-N-(4-cyanophenyl)-2-naphthamide |
| B-24 | 3-hydroxy-N-(5-chloro-2,4-dimethoxyphenyl)-2-naphthamide |
| B-25 | 3-hydroxy-N-(4-bromophenyl)-2-naphthamide |

TABLE 2-continued

(Examples of B)

| No. | Structural formula |
|---|---|
| B-26 | 3-hydroxy-N-(4-phenoxyphenyl)-2-naphthamide |
| B-27 | 3-hydroxy-N-(4-iodophenyl)-2-naphthamide |
| B-28 | 3-hydroxy-N-(4-fluorophenyl)-2-naphthamide |
| B-29 | 3-hydroxy-N-(4-ethylphenyl)-2-naphthamide |
| B-30 | 3-hydroxy-N-(4-ethoxyphenyl)-2-naphthamide |
| B-31 | 3-hydroxy-N-(4-methoxycarbonylphenyl)-2-naphthamide |
| B-32 | 3-hydroxy-N-(4-dimethylaminophenyl)-2-naphthamide |
| B-33 | 3-hydroxy-N-(1-naphthyl)-2-naphthamide |
| B-34 | 3-hydroxy-N-(2-naphthyl)-2-naphthamide |
| B-35 | 3-hydroxy-N-(9-ethylcarbazol-3-yl)-2-naphthamide |
| B-36 | 3-hydroxy-N-(4-biphenylyl)-2-naphthamide |

TABLE 2-continued

(Examples of B)

| No. | Structural formula |
|---|---|
| B-37 | 3-hydroxy-2-naphthoic acid N-(2-thienyl)amide |
| B-38 | 3-hydroxy-2-naphthoic acid N-(benzothiazol-2-yl)amide |
| B-39 | 3-hydroxy-2-naphthoic acid N-(benzoxazol-2-yl)amide |
| B-40 | 3-hydroxy-2-naphthoic acid N-(pyridin-4-yl)amide |
| B-41 | 3-hydroxy-2-naphthoic acid N-benzylamide |
| B-42 | 3-hydroxy-2-naphthoic acid N-(4-methoxybenzyl)amide |
| B-43 | 3-hydroxy-2-naphthoic acid N-(3-morpholinopropyl)amide |
| B-44 | 3-hydroxy-2-naphthoic acid N-(2-diethylaminoethyl)amide |
| B-45 | 3-hydroxy-2-naphthoic acid N-methyl-N-phenylamide |
| B-46 | 3-hydroxy-2-naphthoic acid N,N-diphenylamide |
| B-47 | 3-hydroxy-2-anthroic acid N-(4-chloro-2-methylphenyl)amide |

TABLE 2-continued

(Examples of B)

| No. | Structural formula |
|-----|-------------------|
| B-48 | |
| B-49 | |
| B-50 | |
| B-51 | |
| B-52 | |
| B-53 | |
| B-54 | |
| B-55 | |

TABLE 2-continued
| No. | (Examples of B) Structural formula |
|---|---|
| B-56 | 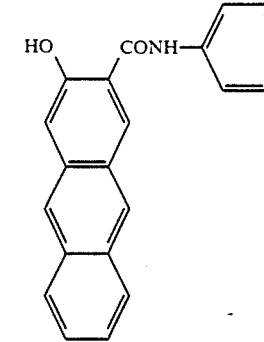 |
| B-57 | |
| B-58 | |
| B-59 | |
| B-60 | |
| No. | (Examples of B) Structural formula |
|---|---|
| B-61 | 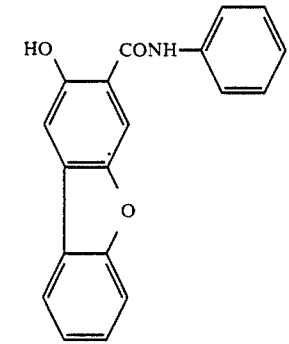 |
| B-62 | |
| B-63 | |
| B-64 | |
| B-65 | |

TABLE 2-continued (Examples of B)

| No. | Structural formula |
|---|---|
| B-66 | 3-hydroxy-N-(9-ethylcarbazol-2-yl)-2-naphthamide |
| B-67 | 3-hydroxy-N-methyl-N-phenyl-2-naphthamide |
| B-68 | 3-hydroxy-N,N-diphenyl-2-naphthamide |
| B-69 | 3-hydroxy-N-(thiophen-2-yl)-2-naphthamide |
| B-70 | 3-hydroxy-2-naphthoic acid 2-acetylhydrazide |
| B-71 | 3-hydroxy-2-naphthoic acid 2-benzoylhydrazide |
| B-72 | 3-hydroxy-N-(naphthalen-1-yl)-2-anthracenecarboxamide |
| B-73 | 3-hydroxy-4-(2-aminophenylamino)-N-phenylbenzamide |
| B-74 | 3-hydroxy-2-naphthoic acid benzylidenehydrazide |
| B-75 | 3-hydroxy-2-naphthoic acid (4-chlorobenzylidene)hydrazide |

TABLE 2-continued

| No. | (Examples of B) Structural formula |
|---|---|
| B-76 | 3-hydroxy-2-naphthamide N'=CH-(2-chlorophenyl) |
| B-77 | 3-hydroxy-2-naphthamide N'=CH-(2-bromophenyl) |
| B-78 | 3-hydroxy-2-naphthamide N'=CH-(4-methylphenyl) |
| B-79 | 3-hydroxy-2-naphthamide N'=CH-(4-cyanophenyl) |
| B-80 | 3-hydroxy-2-naphthamide N'=CH-(4-nitrophenyl) |
| B-81 | 3-hydroxy-2-naphthamide N'=CH-(4-methoxyphenyl) |
| B-82 | 3-hydroxy-2-naphthamide N'=CH-(2-methoxyphenyl) |
| B-83 | 3-hydroxy-2-naphthamide N'=CH-(4-fluorophenyl) |
| B-84 | 3-hydroxy-2-naphthamide N'=CH-(2-methylphenyl) |
| B-85 | 3-hydroxy-2-naphthamide N'=CH-(2-ethylphenyl) |
| B-86 | 3-hydroxy-2-naphthamide N'=C(CH$_3$)H |
| B-87 | 3-hydroxy-2-naphthamide N'=CH-(3-methylphenyl) |

TABLE 2-continued (Examples of B)

| No. | Structural formula |
|---|---|
| B-88 | 3-hydroxy-2-naphthoyl hydrazone of 3-nitrobenzaldehyde |
| B-89 | 3-hydroxy-2-naphthoyl hydrazone of 2,4-dimethylbenzaldehyde |
| B-90 | 3-hydroxy-2-naphthoyl hydrazone of 9-anthraldehyde |
| B-91 | 3-hydroxy-2-naphthoyl hydrazone of 1-naphthaldehyde |
| B-92 | 3-hydroxy-2-naphthoyl hydrazone of 2-naphthaldehyde |
| B-93 | 3-hydroxy-2-naphthoyl hydrazone of 2-thiophenecarboxaldehyde |
| B-94 | 3-hydroxy-2-naphthoyl hydrazone of 2-furaldehyde |
| B-95 | 3-hydroxy-2-naphthoyl hydrazone of 9-ethyl-carbazole-3-carboxaldehyde |
| B-96 | 3-hydroxy-2-naphthoyl hydrazone of 2-pyridinecarboxaldehyde |
| B-97 | 3-hydroxy-2-naphthoyl hydrazone of 3-pyridinecarboxaldehyde |

TABLE 2-continued (Examples of B)

| No. | Structural formula |
|---|---|
| B-98 | 3-hydroxy-2-naphthoic acid CONHN=CH-CH₂-phenyl hydrazide |
| B-99 | 3-hydroxy-2-naphthoic acid CONHN=C(CH₃)-phenyl hydrazide |
| B-100 | 3-hydroxy-2-naphthoic acid CONHN=CH-CH=CH-phenyl hydrazide |
| B-101 | 3-hydroxy-2-naphthoic acid CONHN=CH(CH=CH)₂-phenyl hydrazide |
| B-102 | 3-hydroxy-2-naphthoic acid CONHN=C(phenyl)₂ hydrazide |
| B-103 | 3-hydroxy-2-naphthoic acid N-(indan-1-ylidene) hydrazide |
| B-104 | 3-hydroxy-2-naphthoic acid N-(9H-fluoren-9-ylidene) hydrazide |
| B-105 | 3-hydroxy-2-anthracenecarboxylic acid CONHN=CH-phenyl hydrazide |
| B-106 | 3-hydroxy-2-anthracenecarboxylic acid CONHN=CH-C₆H₄-OCH₃ hydrazide |
| B-107 | 3-hydroxy carbazole-2-carboxylic acid CONHN=CH-C₆H₄-Cl hydrazide |

TABLE 2-continued (Examples of B)

| No. | Structural formula |
|---|---|
| B-108 | |
| B-109 | |
| B-110 | |
| B-111 | |
| B-112 | |
| B-113 | |
| B-114 | |
| B-115 | |
| B-116 | |
| B-117 | |
| B-118 | |
| B-119 | |

TABLE 2-continued (Examples of B)

| No. | Structural formula |
|---|---|
| B-120 | 6-hydroxy-1-(benzamido)naphthalene |
| B-121 | 6-hydroxy-1-(1-naphthoylamino)naphthalene |
| B-122 | 6-hydroxy-1-(4-methoxybenzamido)naphthalene |
| B-123 | 6-hydroxy-1-(4-chlorobenzamido)naphthalene |
| B-124 | 6-hydroxy-1-(3-nitrobenzamido)naphthalene |
| B-125 | 3-hydroxy-2-(benzamido)naphthalene |
| B-126 | 3-hydroxy-2-(4-methoxybenzamido)naphthalene |
| B-127 | 3-hydroxy-2-(1-naphthoylamino)naphthalene |
| B-128 | 3-hydroxy-2-(cinnamoylamino)naphthalene |
| B-129 | 8-hydroxy-5-(benzamido)naphthalene |
| B-130 | 8-hydroxy-5-(2-chlorobenzamido)naphthalene |
| B-131 | 3-hydroxy-4-(benzamido)naphthalene |

TABLE 2-continued
| No. | (Examples of B) Structural formula |
|---|---|
| B-132 | 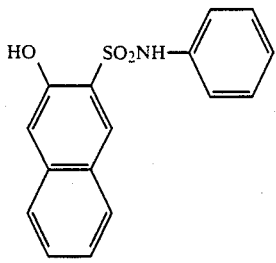 |
| B-133 | 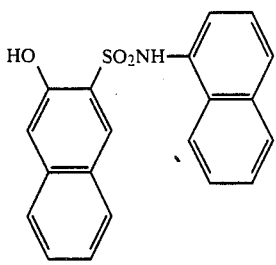 |
| B-134 | 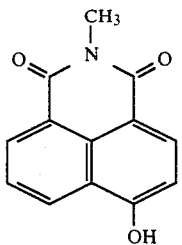 |
| B-135 | 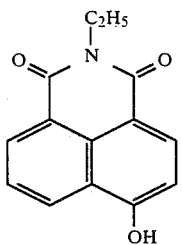 |
| B-136 | 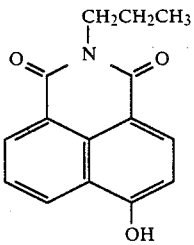 |
| B-137 | 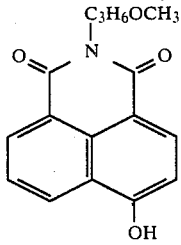 |
| B-138 | 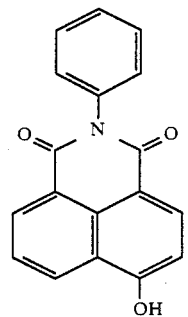 |
| B-139 | 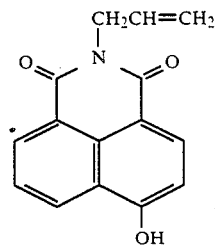 |
| B-140 | 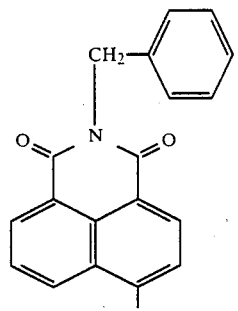 |
| B-141 | 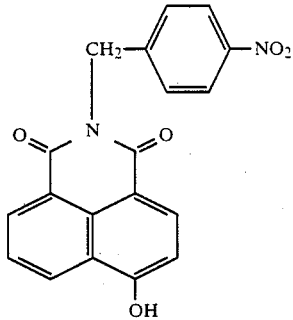 |
| B-142 | 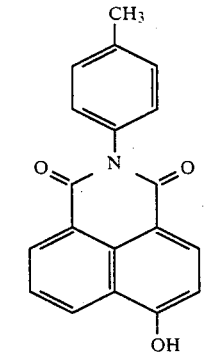 |

TABLE 2-continued (Examples of B)

| No. | Structural formula |
|---|---|
| B-143 | N-methyl-hydroxy-naphthalimide |
| B-144 | N-ethyl-hydroxy-naphthalimide |
| B-145 | N-propyl-hydroxy-naphthalimide |
| B-146 | N-allyl-hydroxy-naphthalimide |
| B-147 | N-benzyl-hydroxy-naphthalimide |
| B-148 | N-phenyl-hydroxy-naphthalimide |
| B-149 | N-(4-methoxyphenyl)-hydroxy-naphthalimide |
| B-150 | N-(4-methylbenzyl)-hydroxy-naphthalimide |
| B-151 | N-(2-methoxyethyl)-hydroxy-naphthalimide |
| B-152 | 3-acetyl-7-hydroxycoumarin (CH₃ variant) |
| B-153 | 3-acetyl-7-hydroxycoumarin |
| B-154 | 3-benzoyl-7-hydroxycoumarin |
| B-155 | 3-(4-nitrophenyl)-7-hydroxycoumarin derivative |
| B-156 | 3-cinnamoyl-7-hydroxycoumarin |

TABLE 2-continued

| No. | (Examples of B) Structural formula |
|---|---|
| B-157 | 3-hydroxy coumarin with COCH$_2$CO$_2$CH$_3$ substituent |
| B-158 | bis-coumarin naphthalene derivative with CO bridge |
| B-159 | 6-hydroxy coumarin with COCH$_3$ substituent |
| B-160 | 6-hydroxy coumarin with COC$_6$H$_5$ (phenyl ketone) substituent |
| B-161 | 6-hydroxy coumarin with CN substituent |
| B-162 | 6-hydroxy coumarin with CONH-phenyl substituent |
| B-163 | 6-hydroxy coumarin with CON(CH$_3$)$_2$ substituent |
| B-164 | 6-hydroxy coumarin with COCH$_2$CO$_2$CH$_3$ substituent |
| B-165 | 6-hydroxy-4-methyl coumarin |
| B-166 | 6-hydroxy coumarin with CN substituent |
| B-167 | 6-hydroxy coumarin with CONHCH$_3$ substituent |
| B-168 | 6-hydroxy coumarin with CON(CH$_3$)(phenyl) substituent |

D in the formula (I) represents a divalent group in which the carbon atom bonded to the azo group is an SP$^2$ type carbon atom forming a double bond. Such divalent group includes those derived from aromatic hydrocarbon ring or aromatic heterocyclic ring; compounds formed from aromatic hydrocarbon rings, aromatic heterocyclic rings or both by direct bonding or condensation to form a condensed ring; and compounds formed by combining aromatic hydrocarbons, aromatic heterocyclic compounds or alicyclic hydrocarbons through a bonding group. As typical examples of such divalent group, those derived from benzene, naphthalene, anthraquinone, pyrene, fluorenone, anthraquinone, phenanthrene, biphenylene, triphenylene, perylene, etc., can be mentioned as divalent groups of aromatic hydrocarbon rings, and those derived from N-ethylcarbazole, acridine, xanthone, phenazine, dibenzothiophene, dibenzofuran, etc., can be cited as divalent groups of aromatic heterocyclic rings.

Some examples of the directly bonded divalent groups of aromatic hydrocarbon or aromatic heterocyclic rings or the divalent groups of condensed rings are shown in Table 3 below.

TABLE 3

| No. | Divalent group |
|---|---|
| 1-1 | biphenyl |
| 1-2 | naphthyl-phenyl |
| 1-3 | diphenylamine derivative |
| 1-4 | benzothiazole-phenyl |

TABLE 3-continued

| No. | Divalent group |
|---|---|
| 1-5 | 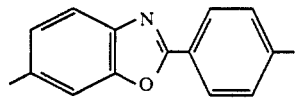 |
| 1-6 | 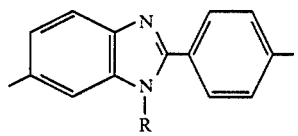 |
| 1-7 | 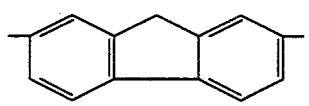 |
| 1-8 | 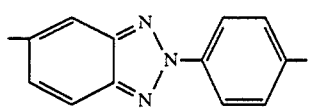 |
| 1-9 | 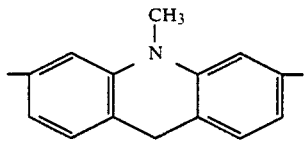 |
| 1-10 | 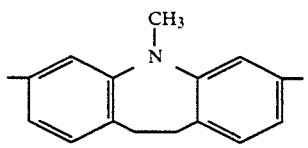 |

TABLE 3-continued

| No. | Divalent group |
|---|---|
| 1-11 | 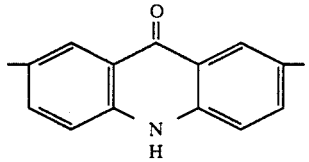 |

Examples of the bonding groups are —O—, —S—, —S—S—, —SO—, —SO$_2$—, —SO$_2$NH—, —CH$_2$—, —NH—, —CO—, —CO—CO—, —CO$_2$—, —CONH—, —CH=CH—,

—CH=C—,
    |
    CN

—CH=CH—CH=CH—, —N=N—, —CH=N—N=CH—, —NH—NH—, —CH=N—, —CONH—NH—, and —NHCONH—.

Examples of the hydrocarbon ring and heterocyclic ring are benzene, naphthalene, acenaphthene, anthracene, pyrene, fluorene, fluorenone, phenanthrene, naphthoquinone, anthraquinone, cyclohexane, cyclohexanone, piperadine, pyrrole, furan, thiophene, oxazole, thiazole, pyrazole, pyrazoline, imidazole, imidazolidine, oxadiazole, thiadiazole, triazole, pyridine, indole, quinoline, carbazole, xanthene, coumarin, xanthone, and phenothiazine. D is obtained by combining these hydrocarbon or heterocyclic rings with said bonding groups. These hydrocarbon and heterocyclic rings may have a substituent.

Some of the examples of D are shown in Table 4 below.

TABLE 4

| No. | Divalent group |
|---|---|
| 2-1 | 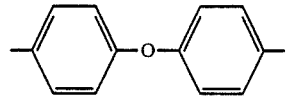 |
| 2-2 | 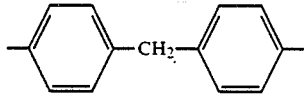 |
| 2-3 | 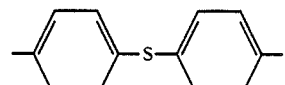 |
| 2-4 | 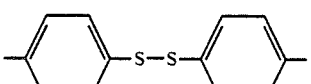 |
| 2-5 | 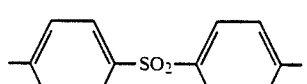 |
| 2-6 | 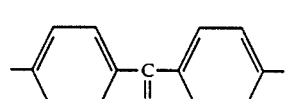 |

TABLE 4-continued

| No. | Divalent group |
|---|---|
| 2-7 | —C₆H₄—C(=O)—C₆H₄— (bis-phenyl ketone, meta-linked) |
| 2-8 | —C₆H₄—CO₂—C₆H₄— |
| 2-9 | —C₆H₄—CH=CH—C₆H₄— |
| 2-10 | —C₆H₄—CH=CH—C₆H₄— (meta) |
| 2-11 | —C₆H₄—CH=C(CN)—C₆H₄— |
| 2-12 | —C₆H₄—CH=C(Br)—C₆H₄— |
| 2-13 | —C₆H₄—N(CH₃)—C₆H₄— |
| 2-14 | —C₆H₄—N(C₆H₅)—C₆H₄— |
| 2-15 | —(naphthyl)—CH=C(CN)—C₆H₄— |
| 2-16 | —C₆H₄—N=N—C₆H₄— |
| 2-17 | —(naphthyl)—N=N—C₆H₄— |

TABLE 4-continued

| No. | Divalent group |
|---|---|
| 2-18 | —C₆H₄—CH=CH—C₆H₄—CH=CH—C₆H₄— |
| 2-19 | —C₆H₄—CH=CH—C₆H₂(OCH₃)₂—CH=CH—C₆H₄— (2,5-dimethoxy) |
| 2-20 | —C₆H₄—CH=CH—(pyridine-2,6-diyl)—CH=CH—C₆H₄— |
| 2-21 | —C₆H₄—CH=CH—(benzene-1,2-diyl)—CH=CH—C₆H₄— |
| 2-22 | —C₆H₄—C(CN)=CH—C₆H₄—CH=C(CN)—C₆H₄— |
| 2-23 | —C₆H₄—CH=N—N=CH—C₆H₄— |
| 2-24 | —C₆H₄—(1,3,4-oxadiazole-2,5-diyl)—C₆H₄— |
| 2-25 | —C₆H₄—(1,3,4-oxadiazole-2,5-diyl)—C₆H₄— (meta) |
| 2-26 | —C₆H₄—CH=CH—(1,3,4-oxadiazole-2,5-diyl)—CH=CH—C₆H₄— |
| 2-27 | —C₆H₄—(4-phenylpyridine-2,6-diyl)—C₆H₄— |
| 2-28 | —(benzoxazole-2,6-diyl)—C₆H₄— |

TABLE 4-continued

| No. | Divalent group |
|---|---|
| 2-29 | benzothiazole-phenyl |
| 2-30 | benzotriazole-phenyl |
| 2-31 | benzimidazole(NH)-phenyl |
| 2-32 | benzoxazole-CH=CH-phenyl |
| 2-33 | benzothiazole-CH=CH-phenyl |
| 2-34 | phenyl-benzoxazole-benzoxazole-phenyl |
| 2-35 | phenyl-C(=N–N=)C-phenyl (thiadiazole) |
| 2-36 | phenyl-C(=N–N=)O-O(=N–N=)C-phenyl |
| 2-37 | phenyl-C(=N–N=)O-phenylene-O(=N–N=)C-phenyl |
| 2-38 | phenyl-CH=C(cyclohexanone)C=CH-phenyl |
| 2-39 | phenyl-CH=C(4-methyl-cyclohexanone)C=CH-phenyl |
| 2-40 | phenyl-CH=CH-C(=O)-phenyl |

TABLE 4-continued

| No. | Divalent group |
|---|---|
| 2-41 |  |
| 2-42 |  |
| 2-43 |  |
| 2-44 | |

The azo compounds according to this invention can be produced by the various processes such as mentioned below.

In one process, one of the amino groups in a diamine represented by the formula (V):

$$H_2N-D-NH_2 \qquad (V)$$

wherein D represents the same as defined above with relation to the formula (I), is protected by a protective group or converted into a nitro group to render said compound into a state incapable of diazotization reaction and the other amino group alone is subjected to a diazotization reaction in the ordinary way, followed by a coupling reaction with a coupler to synthesize a monoazo compound, after which the protective group of the remaining amino group is removed or the nitro group is reduced to restore the original form of amino group, followed by a diazotization reaction and a coupling reaction with a coupler different from the one used previously, thereby producing an azo compound represented by the formula (I).

In another process, a tetrazonium salt represented by the formula (III):

$$X^-N_2{}^+-D-N_2{}^+X^- \qquad (III)$$

is reacted with a mixture of a coupler of the formula (II) and a different coupler to produce an azo compound represented by the formula (I):

$$A-N=N-D-N=N-B \qquad (I)$$

It is possible to use azo compounds produced by any of the available processes, but the first-described process has the defects that many reaction steps are involved and that the compound production cost is high. The second process is the same as the conventional method except for use of two different types of coupler instead of using a single coupler and is advantageous over the first process in that it allows easier preparation of the objective compound.

In the second process, however, since the reaction is carried out by mixing the couplers, it is liable that there would be produced an azo compound having the same coupler (the compound of the formula (VI) or (VII) shown below) as well as an azo compound of the formula (I) having the different couplers.

$$A-N=N-D-N=N-B \qquad (I)$$

$$A-N=N-D-N=N-A \qquad (VI)$$

$$B-N=N-D-N=N-B \qquad (VII)$$

There is no problem when the ratio of the compound of the formula (VI) or (VII) mixed in the product is low, but in case the ratio of said compound (VI) or (VII) is high, the product will show the properties more closer to those of the compound (VI) or (IVII) than those of the azo compound (I) of this invention, so that when using the second process, it is necessary to select the reaction conditions that will make the ratio of the azo compound (I) higher than that of the compound (VI) or (VII) as much as possible.

The studies on this point by the present inventors disclosed that the coupling reaction takes a different mode depending on the molecular structure of the coupler and an azo compound of this invention represented by the formula (I) can be synthesized with higher purity by properly selecting the reaction conditions such as the mixing ratio of the couplers.

Thus, the azo compounds of this invention can be easily synthesized by the second process described above.

The synthesis process will be described more exactly below.

An azo compound represented by the formula (I):

$$A-N=N-D-N=N-B. \qquad (I)$$

can be synthesized by subjecting a tetrazonium salt represented by the formula (III):

$$X^- N_2^+ - D - N_2^+ X^- \qquad (III)$$

and a mixture of couplers A–H and B–H to a coupling reaction in a known way. In this reaction, water and/or an organic solvent such as dimethylformamide, dimethylacetamide, dimethyl sulfoxide, N-methylpyrrolidone, methanol, ethanol, isopropanol or the like is preferably used as reaction solvent. The reaction is carried out in the presence of a base at a temperature below 30° C. for a period of about 30 minutes to 10 hours.

Two types of coupler are mixed in equimolar amounts, or when the two couplers differ in reactivity, the coupler with lower reactivity is used in an amount excess of the other coupler. It is usually preferred to carry out the reaction by using the coupler with higher reactivity in a ratio of 1 to 1.5 mole to one mole of tetrazonium salt.

The couplers used in this invention can be synthesized by a known method.

The coupler of the formula (II-a) or (II-b) can be obtained from a process comprising heating a hydroxynaphthalic anhydride (VIII) and a diamine (IX) in an organic solvent such as acetic acid to effect dehydrating condensation according to the following Reaction Scheme A (see Japanese Patent Publication No. 61-30265).

Reaction Scheme A

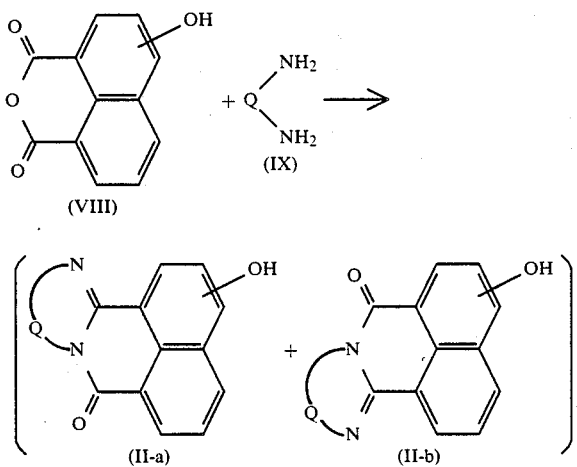

The coupler synthesized from the above process is obtained as a mixture of isomers of the formulae (II-a) and (II-b). In the present invention, both of these isomers can be used. Usually the isomers produced from the reaction are not separated and subjected to the coupling reaction in the form of mixture.

The photoreceptor for electrophotography according to this invention has a photosensitive layer containing at least one of the azo compounds represented by the formula (I). Various types of sensitive layers are known, and any of these sensitive layers can be used for the photoreceptor for electrophotography of this invention. Usually, the following types of sensitive layer are employed:

(1) Sensitive layer composed of an azo compound;
(2) Sensitive layer having an azo compound dispersed in a binder;
(3) Sensitive layer having an azo compound dispersed in a known charge carrier transport material;
(4) Laminated sensitive layer comprising a sensitive layer of any of (1) to (3) serving as a charge generating layer and having laminated thereon a charge transport layer containing a known charge carrier transport material.

The azo compounds of the formula (I) generate a charge carrier at an extremely high efficiency upon absorbing light. The generated carrier can be transported through the azo compound acting as medium, but it is preferred to let said carrier transport by using of a known charge carrier transport material.

In this respect, it is especially preferable to constitute a layered type photoreceptor in which an azo compound of this invention is dispersed in a binder to form a charge generating layer and a charge transport layer containing a known charge carrier transport material is laminated thereon, or a single layer type photoreceptor in which a known charge carrier transport material is added into said azo compound-dispersed layer.

The azo compounds of the formula (I) according to this invention are high in charge carrier generation efficiency and in carrier injection efficiency into the charge carrier transport material and have very excellent characteristics as a carrier generating material for said layered or single-layer type function-separated photo-receptor.

The charge carrier transport material used in combination with an azo compound of this invention is generally classified into two types: electron transport material and hole transport material. Said both types of charge carrier transport material can be used, either singly or in combination, for the photoreceptor of this invention. As electron transport material, there can be mentioned electron accepting compounds having an electron accepting group such as nitro group, cyano group, ester group, etc., the typical examples of such electron accepting compounds being nitrated fluorenones such as 2,4,7-trinitrofluorenone and 2,4,5,7-tetranitrofluorenone, and tetracyanoquinodimethane. As hole transport material, there can be mentioned electron donating organic photoconductive compounds, for example, heterocyclic compounds such as carbazole, indole, imidazole, oxazole, thiazole, oxadiazole, pyrazole, pyrazoline, thiadiazole, benzoxyazole, benzothiazole and naphthothiazole, diarylalkane derivatives such as diphenylmethane, triarylalkane derivatives such as triphenylmethane, triarylamine derivatives such as triphenylamine, phenylenediamine derivatives, N-phenylcarbazole derivatives, diarylethylene derivatives such as stilbene, and hydrazone compounds. Especially preferred are the compounds of strong electron donative characteristics such compounds as having a substituted amino group such as dialkylamino or diphenylamino group, an electron donative group such as alkoxy or alkyl group, or an aromatic cyclic group substituted with said electron donative group. It is also possible to employ the polymers having a group derived from said compounds in the main or side chain, such as polyvinylcarbazole, polyglycidylcarbazole, polyvinylpyrene, polyvinylphenylanthracene, polyvinylacridine and pyrene-formaldehyde resin. The especially preferred are hydrazone compounds represented by the following formula (X):

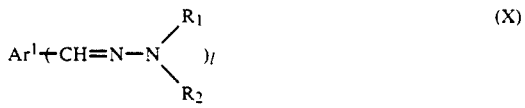

wherein $Ar^1$ represents an aromatic hydrocarbon group which may have a substituent, such as phenyl, naphthyl, anthryl, pyrenyl and styryl, or a heterocyclic group such as carbazoryl; $R^1$ and $R^2$ represent independently an alkyl group such as methyl and ethyl, an aryl group such as phenyl and naphthyl, or an aralkyl group such as benzyl, but at least one of $R^1$ and $R^2$ is an aryl group; $l$ is a number of 1 or 2.

The photoreceptor for electrophotography according to this invention is characterized by having on a conductive substrate a sensitive layer containing an azo compound synthesized according to this invention, but the photoreceptor of this invention may also have an intermediate layer such as adhesive layer or blocking layer, a protective layer or other layers for improving the properties such as electrical and mechanical properties. As the conductive substrate, there can be used any of the known types employed in conventional photoreceptor for electrophotography, for example, metallic drum or sheet made of such metal as aluminum, copper, etc., laminate of foils of such metals, and vacuum deposited articles of such metals. It is also possible to use plastic film, plastic drum, paper, etc., which have been subjected to a conductive treatment thereon by coating conductive materials such as metal powder, carbon black, copper iodide, conductive polymer, high-molecular electrolyte or the like with an appropriate binder; conductive plastic sheet or drum containing a conductive material such as metal powder, carbon black, carbon fiber, etc.; and plastic film having on its surface a layer of a conductive metal oxide such as tin oxide, indium oxide and the like.

The sensitive layer containing an azo compound according to this invention can be produced by the conventional methods.

For instance, a photoreceptor for electrophotography having a sensitive layer of the type (1) methioned above can be produced by coating a solution obtained by dissolving or dispersing an azo compound of the formula (I) in a suitable solvent on a conductive substrate and drying to form a sensitive layer having a thickness of several μm to several ten μm. As the solvent used for said coating solution, there can be mentioned basic solvents capable of dissolving bis-azo compounds such as butylamine and ethylamine; ethers such as tetrahydrofuran and 1,4-dioxane; ketones such as methyl ethyl ketone and cyclohexanone; aromatic hydrocarbons such as toluene and xylene; aprotic polar solvents such as N,N-dimethylformamide, acetonitrile, N-methylpyrrolidone and dimethyl sulfoxide; alcohols such as methanol, ethanol and isopropanol; esters such as ethyl acetate, methyl formate and methyl cellosolve acetate; chlorinated hydrocarbons such as dichloroethane and chloroform, and other like substances capable of dispersing azo compounds. In case of using solvent which disperses an azo compound, it is necessary to grind the azo compound into fine particles of a size not larger than 5 μm, preferably not larger than 1 μm, more preferably not larger than 0.5 μm.

When a binder is dissolved in the coating solution used for forming a sensitive layer of the type (1) mentioned above, it is possible to produce a photoreceptor for electrophotography having a sensitive layer of the type (2).

As binder, there can be used polymers or copolymers of vinyl compounds such as styrene, vinyl acetate, acrylic ester, methacrylic ester, vinyl alcohol and ethyl vinyl ether, phenoxy resin, polysulphone, polyvinyl acetal, polycarbonate, polyester, polyamide, polyurethane, cellulose ester, cellulose ether, epoxy resin, silicon resin and the like.

The mixing ratio of the binder polymer to the azo compound of this invention is not specifically defined, but usually the binder polymer is preferably used in a ratio of 5–500 parts by weight, more preferably 20–300 parts by weight to 100 parts by weight of the azo compound.

Said coating solution may contain, in addition to said materials, a dispersion stabilizer, improver of coating properties, and other additives for improving quality such as dyestuff, electron attractive compounds, etc.

When a charge carrier transport material is dissolved in the coating solution used for forming a sensitive layer of the type (1) mentioned above, there can be produced a single-layer function-separated type photoreceptor. As charge carrier transport material, any of those mentioned previously can be used. It is preferred to use a binder polymer except when using a polymeric charge carrier transport material such as polyvinylcarbazole and polyglycidylcarbazole, which has in itself the film-forming properties and can be used as binder.

As binder polymer, any of those mentioned previously can be used.

In this case, such binder polymer is used in an amount of usually 10 to 1,000 parts by weight, preferably 30 to 500 parts by weight to 10 parts by weight of azo compound. The charge carrier transport material is used in an amount of 5 to 1,000 parts by weight, preferably 20 to 500 parts by weight to 10 parts by weight of azo compound. In the case of a charge carrier transport material which itself can be used as binder, such charge carrier transport material is used in an amount of usually 3 to 100 parts by weight to 1 part by weight of azo compound.

In this case, it is possible to use other binder polymer(s) for improving quality of the sensitive layer such as adhesiveness, flexibility, etc.

The thickness of the single-lāyer type sensitive layer is usually 5 to 50 μm, preferably 10 to 30 μm.

When an azo compound-containing sensitive layer of the types (1)–(3) mentioned above is applied as charge generating layer and a charge transport layer containing a charge carrier transport material such as mentioned above is laminated thereon, there can be obtained a layered function-separated type photoreceptor of the type (4). In this case, the charge generating layer is of a thickness in the range of 0.05 to 5 μm, preferably 0.1 to 2 μm.

Two or more different types of charge carrier transport material may be used in admixture. In case the charge carrier transport material is a high-molecular compound having the film-forming properties, no binder polymer may be used, but binder polymer may be mixed for improving flexibility or other purposes. In case the charge carrier transport material is a low-molecular compound, a binder polymer needs to be used for forming a film. As binder polymer, those mentioned above can be used. The amount of such binder polymer used in this case is usually in the range of 50 to 3,000 parts by weight, preferably 70 to 1,000 parts by weight, to 100 parts by weight of charge carrier transport material.

The charge transport layer may contain other various types of additives for improving the product performance or increasing mechanical strength, durability, etc., of the coating film. Such additives include electron accepting compounds, coloring matter, stabilizers such as ultraviolet absorber and antioxidant, improver of coating properties, plasticizer, crosslinking agent, etc.

Examples of electron accepting compounds are quinones such as chloranil, 2,3-dichloro-1,4-naphthoquinone, 2-methylanthraquinone, 1-nitroanthraquinone, 1-chloro-5-nitroanthraquinone, 2-chloroanthraquinone and phenanthrenequinone; aldehydes such as 4-nitrobenzaldehyde; ketones such as 9-benzoylanthracene, indandione, 3,5-dinitrobenzophenone and 3,3',5,5'-tetranitrobenzophenone; acid anhydrides such as phthalic anhydride and 4-chloronaphthalic anhydride; cyano compounds such as tetracyanoethylene, terephthalalmalononitrile, 4-nitrobenzalmalononitrile, 4-benzoyloxybenzalmalononitrile and 4-(p-nitrobenzoyloxy)benzalmalononitrile; and phthalides such as 3-benzalphthalide, 3-(α-cyano-p-nitrobenzal)phthalide and 3-(α-cyano-p-nitrobenzal)-4,5,6,7-tetrachlorophthalide.

The order of laminating the charge generating layer and the charge transport layer is free to choose, but usually the charge transport layer is laminated on the charge generating layer for the reason that the charge generating layer is thin and liable to be subjected to mechanical damage. The thickness of the charge transport layer is 5 to 50 μm, preferably 10 to 30 μm.

The photoreceptor for electrophotography containing a diazo compound according to this invention has high sensitivity and is also excellent in color sensitivity. Especially, it is minimized in light-fatigue, so that when it is used repeatedly, it suffers little change in sensitivity, charge acceptance and residual potential, and has high stability and very excellent durability. The photoreceptor of this invention is not only suited for high-speed PPC but can be also advantageously applied as a photoreceptor for printers such as laser printer, liquid crystal shutter printer, LED printer, etc., where especially high stability of performance and reliability are required.

The present invention will hereinafter be described more in detail with reference to the examples and reference example, but the scope of the present invention is not limited to these examples. In the following descriptions of the examples and referential example, all "parts" are by weight unless otherwise noted.

REFERENCE EXAMPLE

In a mixed solvent of 30 parts of acetic acid and 150 parts of nitrobenzene, were dissolved 13.8 parts of 3-hydroxyphthalic anhydride (produced by Tokyo Kasei Kogyo KK) and 9.2 parts of o-phenylenediamine (produced by Tokyo Kasei Kogyo KK) and reacted under stirring at the boiling point of acetic acid for 2 hours. The reaction mixture was cooled to room temperature and the precipitated crystals were filtered out, washed well with methanol and dried. The obtained crystals were yellow and feathery and was not melted at temperatures below 320° C. Elemental analysis and infrared absorption spectrometry of the crystal showed that it was composed of 2-hydroxy- and 5-hydroxy-7H-benzimidazo-[2,1-a]benz[de]isoquinoline-7-one.

Yield: 17.8 parts.

Anal. Calcd. for $C_{18}H_{10}O_2N_2$: C, 75.54%; H, 3.53%; N, 9.78%.

Found: C, 75.50%; H, 3.49%; N, 9.72%.

PREPARATION EXAMPLE 1:

In 825 parts of dimethyl sulfoxide, were dissolved 2.43 parts of said 2-hydroxy- and 5-hydroxy-7H-benzimidazo-[2,1-a]benz[de]isoquinoline-7-one (coupler No. A-1) and 2.24 parts of Napthol AS (Coupler No. B-12). To this solution maintained at 20°-23° C. was added a solution formed by dissolving in 55 parts of dimethyl sulfoxide 2.92 parts of tetrazoniumborofluoride obtained by diazotizing 2,5-bis-(p-aminophenyl)-1,3,4-oxadiazole. To the resulting solution under stirring was added dropwise a solution of 5 parts of sodium acetate in 15 parts of water, and the mixed solution was kept stirred for 3 hours. The formed precipitate was filtered out, washed with dimethyl sulfoxide, dilute acetic acid, water, methanol and tetrahydrofuran successively in that order and then dried. Yield was 1.74 parts (32.5%). An infrared absorption spectrum of this azo compound is shown in FIG. 1.

Anal. Calcd. for $C_{49}H_{29}N_9C_5$: C, 71.44%; H, 3.55%; N, 15.30%.

Found: C, 71.43%; H, 3.69%; N, 15.11%.

As the structural formula of the azo compound used for the calculation, the following formula (P-1) was employed:

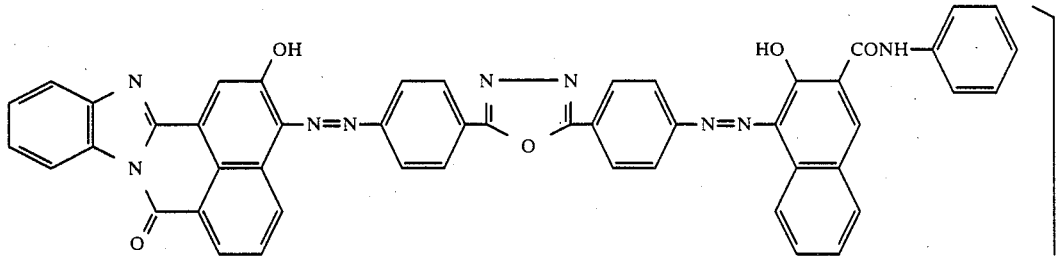

-continued

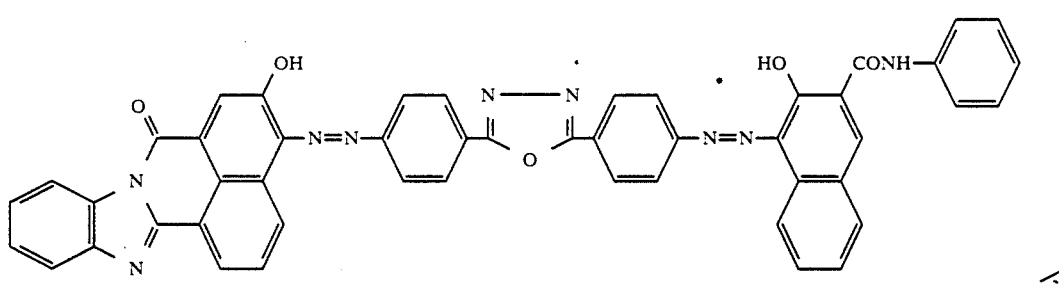

The found values of the elemental analysis agreed well with the calculated values from the structural formula (P-1). In this synthesis reaction, however, a good agreement of elemental analytical values was seen even when two different bisazo compounds (P-2 and P-3) formed from the separate reactions of two types of coupler were mixed in equimolar amounts.

Figure 4:
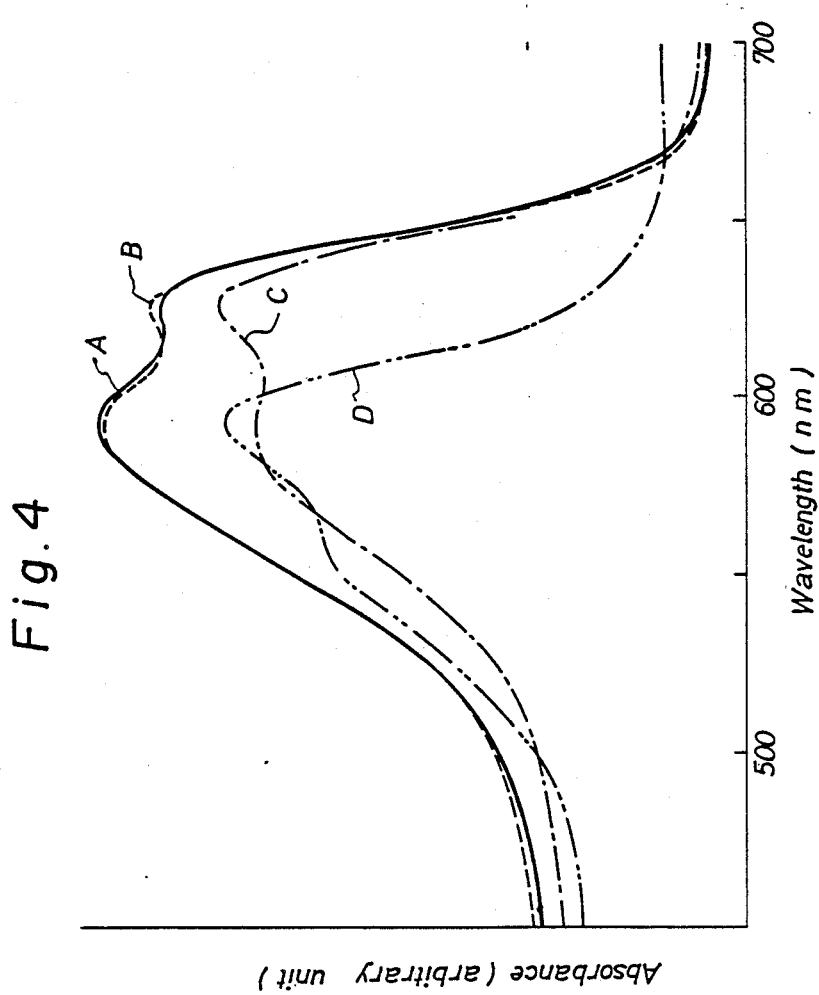

B) (FIG. 4). In this case, a good agreement was obtained. This indicates that the azo compound obtained from the synthesis is not a mixture of P-2 and P-3 but has its own structure. In view of this and the fact that said azo compound shows a spectrum different from the combined spectrum of P-2 and P-3 conceivable from the results of elemental analysis, it was confirmed that the

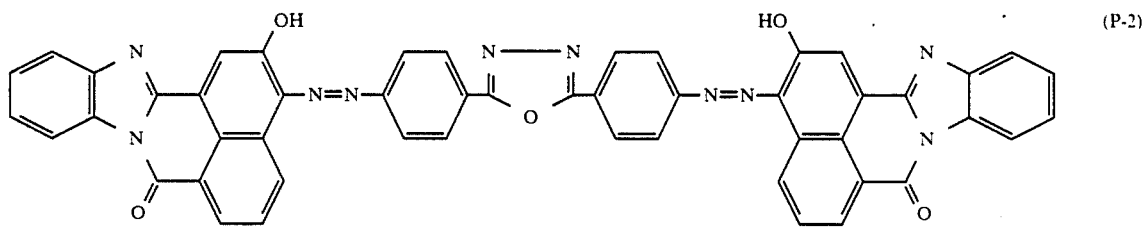

(P-2 shows only one of the three different isomers formed by the reactions).

synthesized azo compound has the structure of P-1.

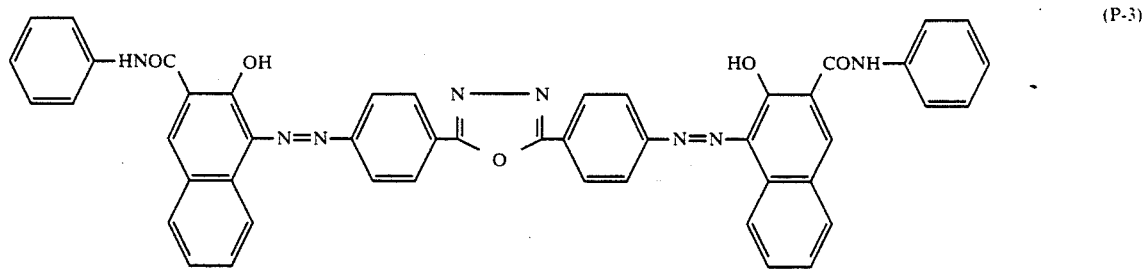

Figure 2:
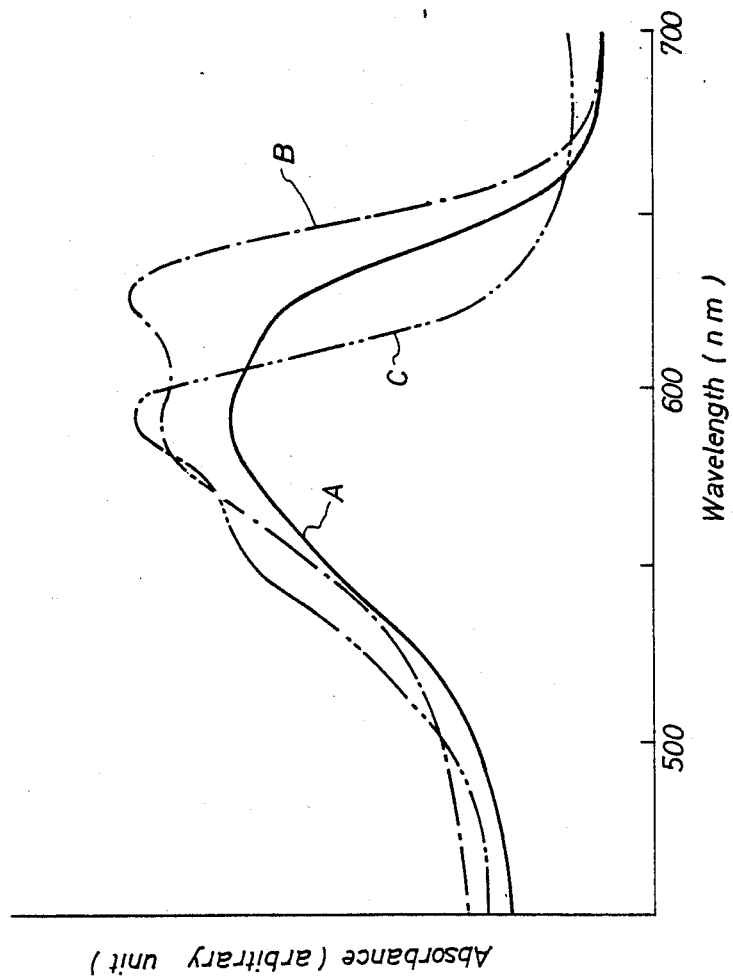
Figure 3:
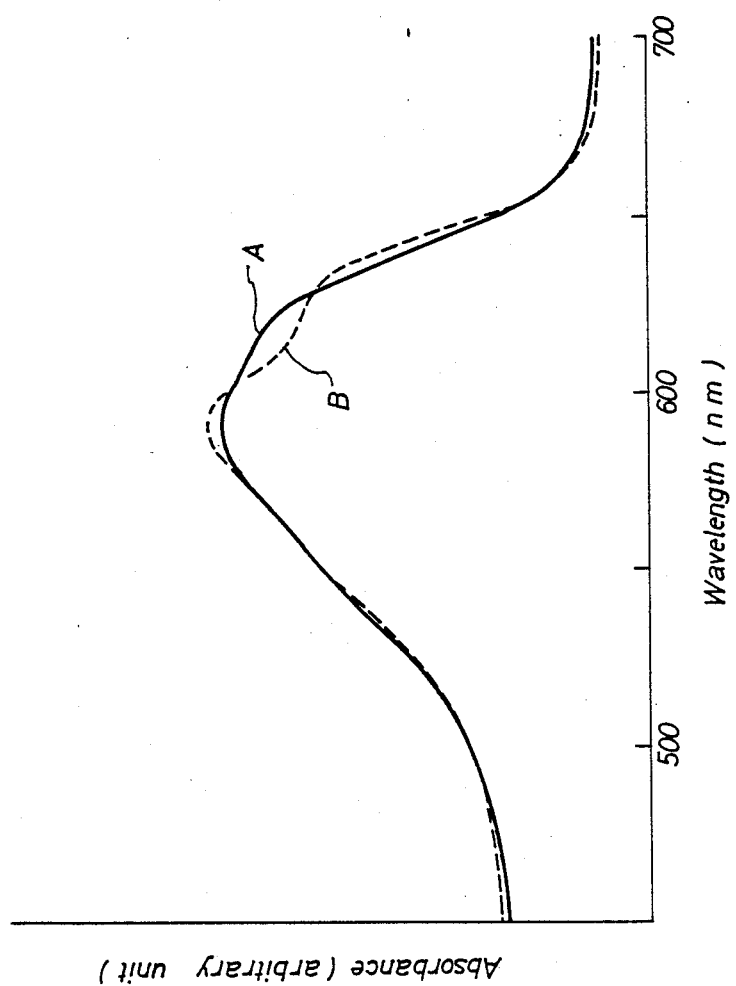

In order to distinguish these two cases, the absorption spectra of the sulfuric acid solutions of the azo compounds were measured (FIGS. 2–4).

FIG. 2 shows the absorption spectra of the respective azo compounds in a sulfuric acid solution. It will be seen that the absorption of the synthesized azo compound (A) shows a different spectrum from those of the azo compounds P-2 and P-3 (B showing the absorption spectrum of P-2 and C the absorption spectrum of P-3).

In order to confirm whether the spectrum A is a combined version of the spectra of P-2 and P-3, the spectra of P-2 and P-3 were combined (absorption spectrum B) to determine the spectral curve closest to the spectrum A by calculation according to the least-squares method (FIG. 3).

The results of FIG. 3 show that no good agreement was obtained.

For determining the precision of combination of spectral curves, the absorption spectrum (spectrum A) obtained for a mixture of the azo compounds of P-2 (absorption spectrum C) and P-3 (absorption spectrum D) was compared with the result of combination of absorption spectra of P-2 and P-3 (absorption spectrum

PREPARATION EXAMPLE 2:

In 825 parts of dimethyl sulfoxide, were dissolved 4.86 parts of coupler A-1 and 2.24 parts of coupler B-12. To this solution, was added a solution formed by dissolving in 55 parts of dimethyl sulfoxide 3.8 parts of tetrazoniumborohydrofluoride obtained from 2,5-bis(p-aminophenyl)-1,3,4-oxadiazole, and the mixed solution was subjected to a coupling reaction and further treatments according to Preparation Example 1 to obtain an azo compound.

Yield: 4.08 parts (59.0%).

Anal. Calcd. for $C_{49}H_{29}N_9O_5$: C, 71.44%; H, 3.55%; N, 15.30%.

Found: C, 71.55%; H, 3.66%; N, 15.15%.

Figure 5:
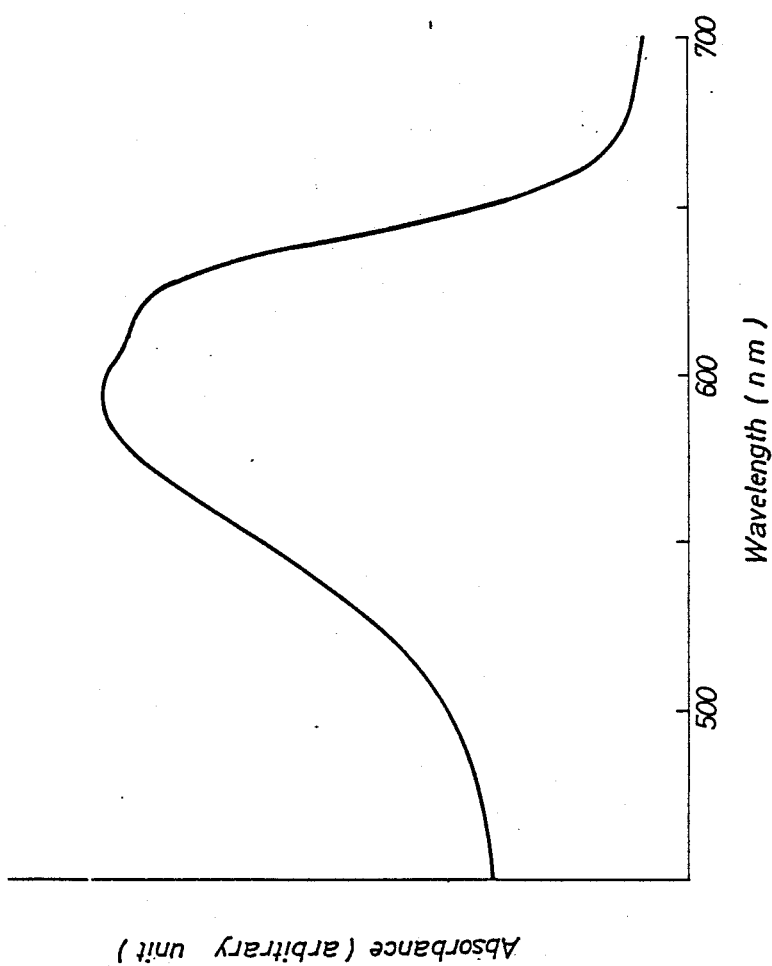
FIG. 5 is an absorption spectrum of the azo compound obtained in Preparation Example 2.

An absorption spectrum of a sulfuric acid solution of this compound is shown in FIG. 5. The mixing ratio of the two types of coupler, which was 1:1 (by mole) in Preparation Example 1, was 2:1 in Preparation Example 2, that is, in this example, the coupling reaction was carried out by using double as much amount of coupler A-1 as coupler B-12, but both the elemental analytical values and the absorption spectrum agreed with those of the compound of the structural formula P-1. Thus, there was obtained an azo compound having the structure of P-1.

PREPARATION EXAMPLE 3:

The procedure of Preparation Example 1 was followed except for use of 2.65 parts of Naphthol AS-TR (Coupler No. B-19) instead of Naphthol AS (coupler No. B-12) to obtain 2.5 parts of an azo compound.

Figure 6:
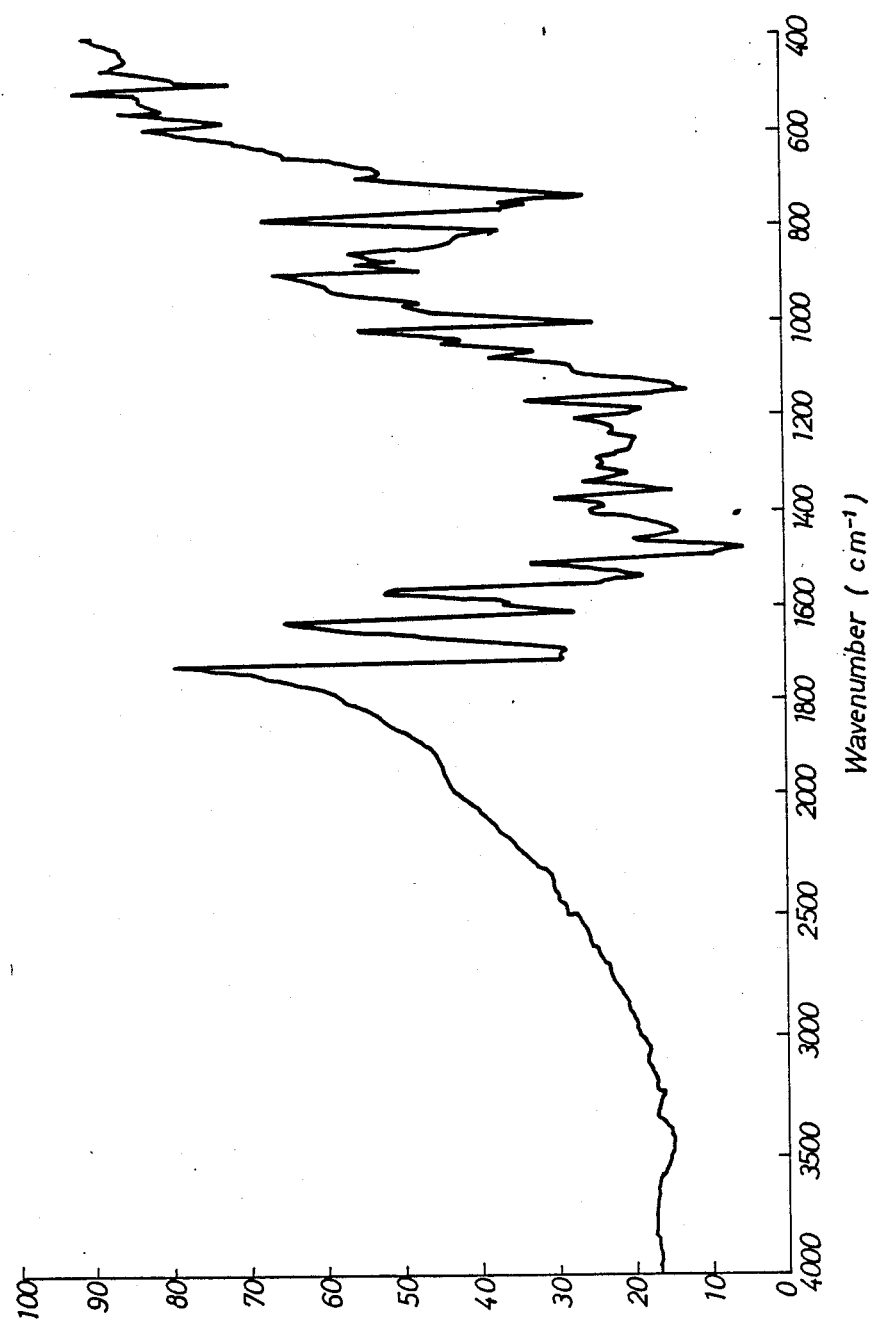
FIG. 6 is an absorption spectrum of the azo compound obtained in Preparation Example 3.

An infrared absorption spectrum of this compound is shown in FIG. 6.

The elemental analytical values agreed well with the calculated values obtained when the structure of the azo compound was supposed to be of the formula P-4 shown below.

SP-428 made by Kawaguchi Electric Works): first the photoreceptor was charged by $-5.3$ KV corona charging in a dark place and then exposed to white light of 5 lux, and the exposed amount of light required for the surface potential to decrease from $-450$ V to $-225$ V was measured.

The thus determined half-decay exposure ($E_{\frac{1}{2}}$) of said photoreceptor was 1.2 lux.sec. The surface potential (residual potential) after sufficient exposure (after 50 lux.sec exposure) was $-1$ V.

For examining durability of this photoreceptor, it was subjected to 2,000 times of repetition of charging and exposure, and the changes of surface potential (Vo) after corona charging, sensitivity ($E_{178}$) and residual potential (Vr) were measured. Exposure intensity was

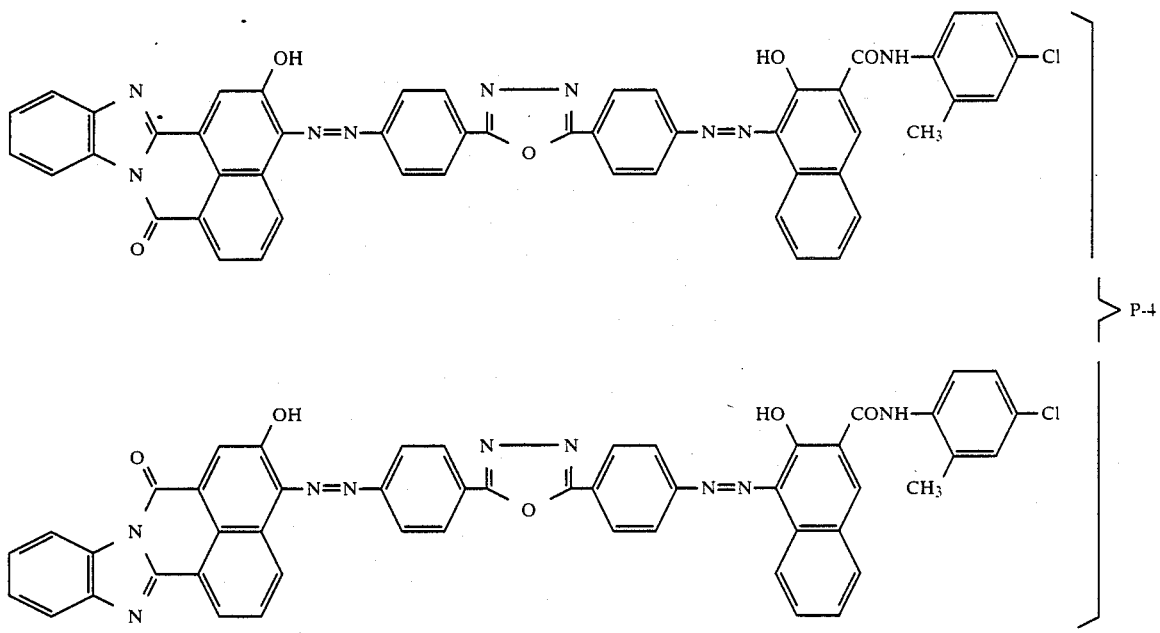

Anal. Calcd. for $C_{50}H_{30}N_9O_5Cl$: C, 68.85%; H, 3.47%; N, 14.45%; Cl, 4.06%.

Found: C, 68.94%; H, 3.57%; N, 14.16%; Cl, 3.53%.

EXAMPLE 1:

One part of azo compound synthesized in Preparation Example 1 and one part of polyvinyl butyral resin (S-Lec B produced by Sekisui Chemical Co., Ltd.) were ground by a sand grinder and dispersed in 100 parts of tetrahydrofuran. This dispersion was applied on an aluminum-deposited 75 μm thick polyester film so that the coating thickness after drying would become 0.4 g/m², and the coating was dried to form a charge generating layer.

On this charge generating layer, was applied a solution of 90 parts of N-methyl-3-carbazolecarbaldehyde diphenyl-hydrazone and 100 parts of polycarbonate resin (NOVALEX 7030A produced by Mitsubishi Kasei Corporation) in 1,000 parts of tetrahydrofuran so that the coating thickness after drying would become 13 μm, and the coating was dried to form a charge transport layer. There was thus obtained a double-layered photorecepter for electrophotography.

For determining the sensitivity of this photoreceptor, its half decay exposure ($E_{\frac{1}{2}}$) was measured.

The half decay exposure was measured in the following way by using an electrostatic paper analyzer (Model conducted by applying 50 lux.sec. of white light.

Sensitivity ($E_{\frac{1}{2}}$) was determined by measuring the half decay exposure required for reducing the surface potential from $-400$ V to $-200$ V.

The results of measurements are shown in Table 5.

TABLE 5

|  | Vo (V) | Vr (V) | $E_{\frac{1}{2}}$ (lux.sec) |
|---|---|---|---|
| Initial | $-512$ | $-1$ | 0.99 |
| After 2,000 cycles | $-516$ | $-4$ | 0.98 |

The results of Table 5 evidently show that said photoreceptor has very stable properties.

EXAMPLES 2-21:

Photoreceptors were made by following the same procedure as Example 1 except that, instead of using the azo compound of Example 1, there were used the azo compounds having the following structure:

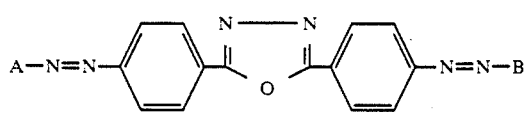

(XI)

in which couplers A and B are those of the structures A-H and B-H shown in Tables 1 and 2, and the sensitivities of the obtained photoreceptors were measured.

The results of measurements are shown in Table 6.

TABLE 6

| Example | Coupler structure A-E | B-H | $E_{\frac{1}{2}}$ (lux.sec) |
|---|---|---|---|
| 2 | A-1 | B-14 | 1.3 |
| 3 | A-1 | B-15 | 2.4 |
| 4 | A-1 | B-16 | 1.2 |
| 5 | A-1 | B-19 | 1.3 |
| 6 | A-1 | B-21 | 1.6 |
| 7 | A-1 | B-33 | 1.7 |
| 8 | A-1 | B-39 | 2.0 |
| 9 | A-1 | B-41 | 1.7 |
| 10 | A-1 | B-47 | 2.4 |

TABLE 6-continued

| Example | Coupler structure A-E | B-H | $E_{\frac{1}{2}}$ (lux.sec) |
|---|---|---|---|
| 11 | A-1 | B-53 | 3.0 |
| 12 | A-3 | B-68 | 2.5 |
| 13 | A-4 | B-76 | 2.6 |
| 14 | A-6 | B-80 | 2.1 |
| 15 | A-3 | B-84 | 2.0 |
| 16 | A-1 | B-134 | 1.9 |
| 17 | A-3 | B-135 | 2.1 |
| 18 | A-1 | B-152 | 2.5 |
| 19 | A-1 | B-153 | 2.3 |
| 20 | A-1 | B-154 | 2.3 |
| 21 | A-3 | B-158 | 2.4 |

EXAMPLES 22–29:

Photoreceptors were made by following the same procedure as Example 1 except that the azo compounds represented by the following formula (XII) were used in place of the azo compound used in Example 1, and the sensitivities of these photoreceptors were determined.

The results are shown in Table 7.

(XII)

TABLE 7

| Example | —D— | $E_{\frac{1}{2}}$ (lux · sec) |
|---|---|---|
| 22 | 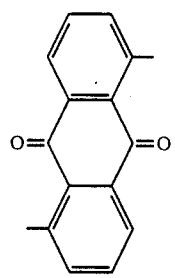 | 1.8 |
| 23 | | 1.4 |
| 24 | | 6.0 |
| 25 | | 9.6 |

TABLE 7-continued

| Example | —D— | $E_{12}$ (lux · sec) |
|---|---|---|
| 26 | (4-methylphenyl)-CH=, cyclohexanone with =CH-(4-methylphenyl), C=O | 7.5 |
| 27 | (4-methylphenyl)-S-(4-methylphenyl) | 3.3 |
| 28 | (4-methylphenyl)-S-S-(4-methylphenyl) | 1.9 |
| 29 | fluorenone (2,7-dimethyl) | 2.0 |

EXAMPLES 30–35:

Photoreceptors were made by following the same procedure as Example 1 except that 90 parts of 1-pyrene-carbaldehyde diphenylhydrazone was used in place of N-methyl-3-carbazole-carbaldehyde diphenylhydrazone as the charge transport layer composition, and the sensitivities of these photoreceptors were measured.

The sensitivities of the photoreceptors in other Examples were also measured by changing the hydrazone compound in charge transport layer as shown above.

The results are shown in Table 8.

TABLE 8

| Example | Example No. with same charge generating layer | $E_{\frac{1}{2}}$ (lux.sec) |
|---|---|---|
| 30 | 1 | 0.92 |
| 31 | 5 | 1.2 |
| 32 | 6 | 1.4 |
| 33 | 22 | 1.2 |
| 34 | 28 | 1.8 |
| 35 | 29 | 1.3 |

EXAMPLE 36:

A photoreceptor was made by following the procedure of Example 30 except that the thickness of the charge transport layer was changed to 20 μm. The sensitivity ($E_{\frac{1}{2}}$) of this photoreceptor was 0.67 lux.sec.

The spectral sensitivity of this photoreceptor was measured by using monochromic light separated by a monochrometer (Shimadzu Bausch and Lomb High intensity grating monochrometer mfd. by Shimadzu Corp.) as the light source of the electrostatic paper analyzer used in Example 1. The light intensity was measured by an optical power Model 66XLA (made by Photodyne Inc.).

Figure 7:
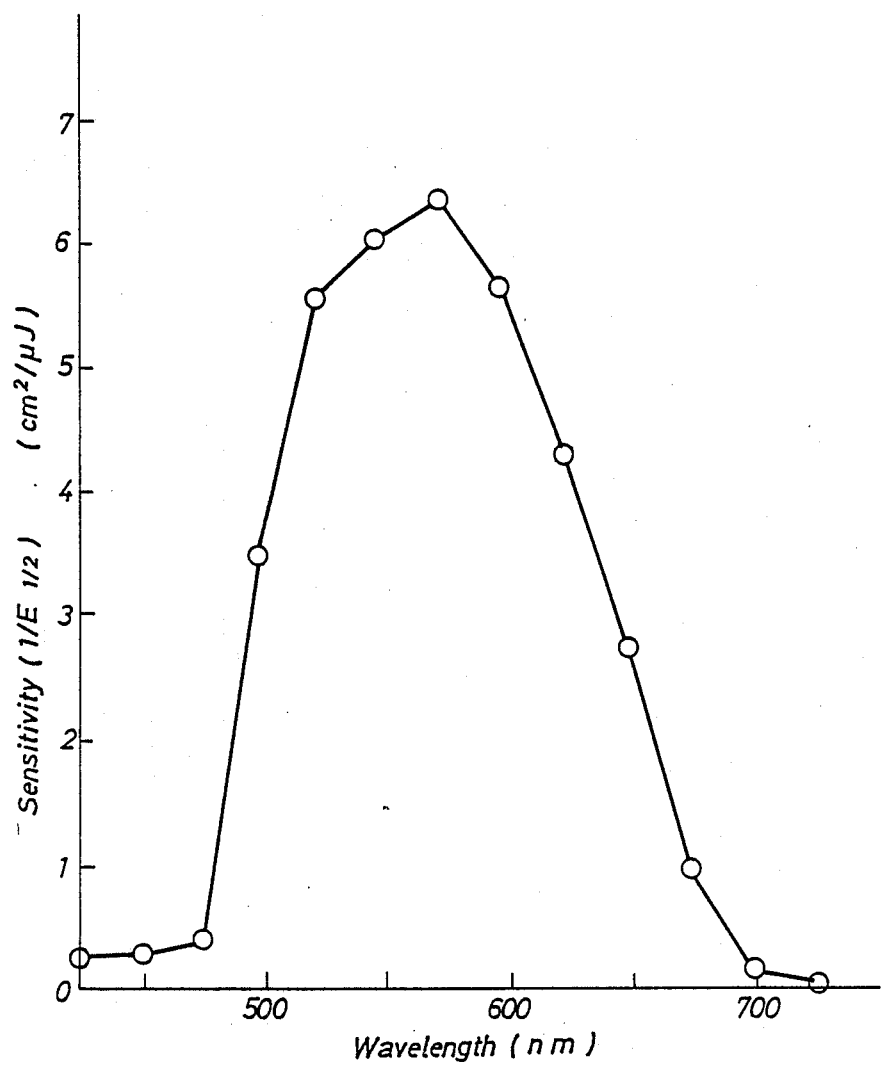
FIG. 7 is a graph showing spectral sensitivity of the photoreceptor obtained in Example 36.

The measured spectral sensitivity is shown in FIG. 7.

Figure 8:
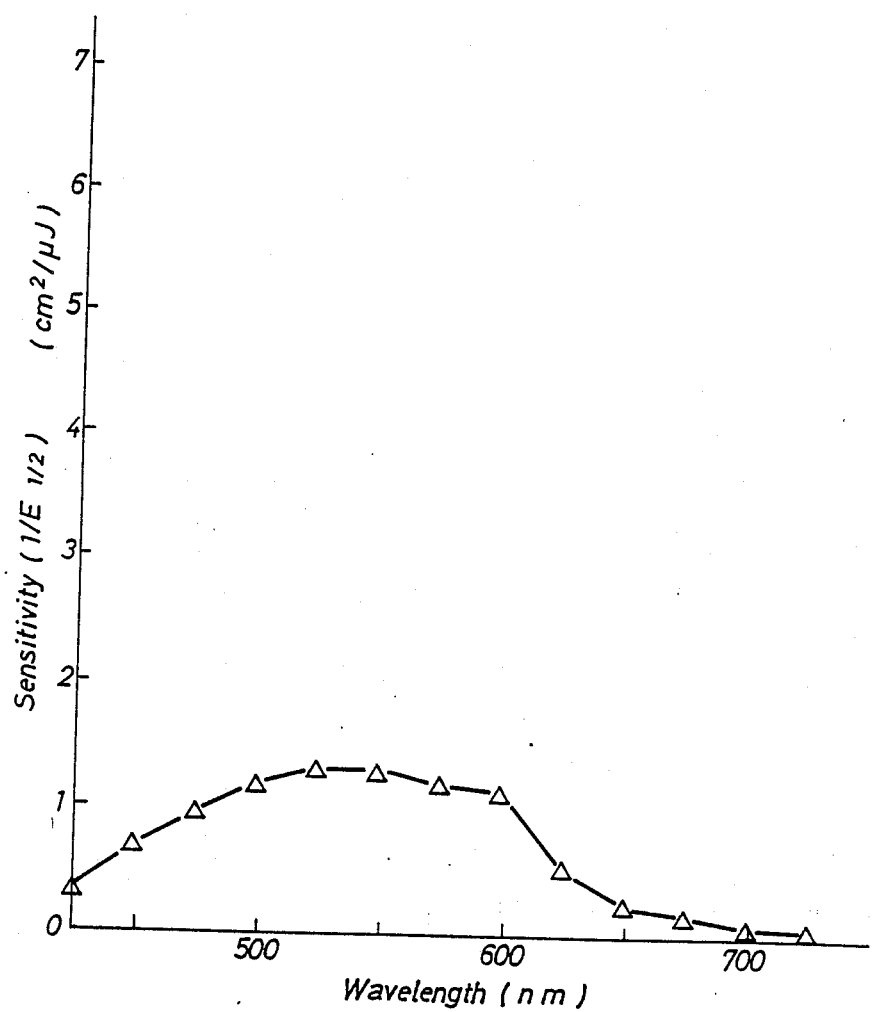
FIG. 8 is a graph showing spectral sensitivity of a commercially available photoreceptor measured for the sake of comparison with Example 36.

In the graph of FIG. 7, the abscissa shows wavelength and the ordinate shows sensitivity (expressed by the reciprocal of $E_{\frac{1}{2}}$). For comparison, the spectral sensitivity of an organic photoreceptor for PPC (SF-750 made by Sharp Corp.) is shown in FIG. 8.

As shown in FIG. 7, the photoreceptor of this invention shows high sensitivity at the wavelength region of 500–600 nm and is suited for PPC.

It is also noted that the peak value of spectral sensitivity is as high as 6.35 cm$^2$/μJ, which is about 6 times higher than that of the spectral sensitivity of the practically used organic photoreceptor shown here for comparison.

Then, a photoreceptor formed by coating an aluminum drum with the same sensitive layer as provided in the above-described photoreceptor was set to a PPC (SF-8200 by Sharp Corp.) and subjected to a life test. After optimizing the exposure intensity in conformity to the sensitivity of the photoreceptor, the charging exposure repetition test was conducted. The surface potential and residual potential after corona charging were shown in Table 8.

TABLE 8

|  | Vo (−V) | Vr (−V) |
|---|---|---|
| Initial | 800 | 20 |
| After 120,000 cycles | 830 | 80 |

The results in Table 8 show that this photoreceptor suffers practically no change for surface potential and residual potential and retains high sensitivity even after 120,000 cycles of charging-exposure repetition, which attests to the extremely high sensitivity, stability and excellent durability of the photoreceptor of the present invention.

When this photoreceptor was used for making 120,000 copies continuously, there was observed no reduction of image density nor any fogging was observed and the clear-image copies were obtained.

What is claimed is:

1. A photoreceptor for electrophotography comprising a conductive substrate and a photosensitive layer thereon containing an azo compound represented by the formula (I):

$$A-N=N-D-N=N-B \quad (I)$$

wherein A represents a coupling component derived from the following formula (II):

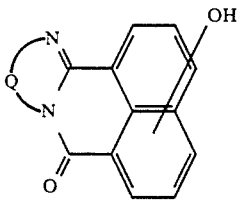

(II)

wherein Q represents a divalent group derived from an aromatic hydrocarbon which may have one or more substituents or a divalent group derived from a heterocyclic compound which may have one or more substituents, B represents a different coupling component having a phenolic hydroxyl group from said A, and D represents a divalent group in which the carbon atoms bonded to the azo groups are $SP^2$ carbon atoms forming double bonds.

2. The photoreceptor according to claim 1, wherein B represents a coupling component different from said A and derived from said formula (II).

3. The photoreceptor according to claim 1, wherein said B represents a coupling component derived from a coupler selected from the group consisting of the couplers of the following formulae (IV-a) to (IV-i):

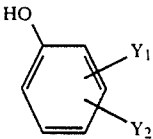

(IV-a)

wherein $Y_1$ and $Y_2$ represent independently hydrogen atom, halogen atom, alkyl group which may have a substituent, aryl group, heterocyclic group, alkoxy group, aryloxy group, aralkyloxy group, carboxyl group, alkoxycarbonyl group, aryloxycarbonyl group, substituted or non-substituted carbamoyl group, substituted or non-substituted hydrazinocarbonyl group, acyl group or acylamino group;

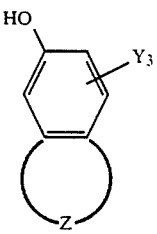

(IV-b)

wherein $Y_3$ represents hydrogen atom, halogen atom, alkyl group which may have a substituent, aryl group, heterocyclic group, alkoxy group, aryloxy group, aralkyloxy group, carboxyl group, alkoxycarbonyl group, aryloxycarbonyl group or acyl group, and Z represents a divalent group forming an aromatic hydrocarbon ring or heterocyclic ring by condensing with the benzene ring;

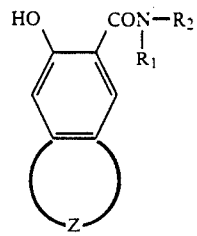

(IV-c)

wherein $R_1$ and $R_2$ represent independently hydrogen atom, lower alkyl group which may have a substituent, aryl group or heterocyclic group, and $R_1$ and $R_2$ may be bonded each other to form a ring, and Z represents the same as defined above in relation to the formula (IV-b);

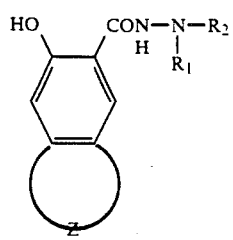

(IV-d)

wherein $R_1$, $R_2$ and Z are as defined above in relation to the formula (IV-c);

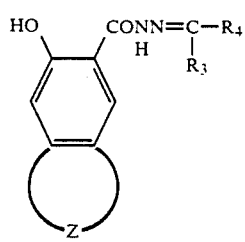

(IV-e)

wherein $R_3$ and $R_4$ represent independently hydrogen atom, alkyl group which may have a substituent, alkenyl group which may have a substituent, alkynyl group which may have a substituent, aryl group, heterocyclic group, vinyl group which may have a substituent or butadienyl group which may have a substituent, and $R_3$ and $R_4$ may be bonded each other to form a ring, and Z is as defined above in relation to the formula (IV-b);

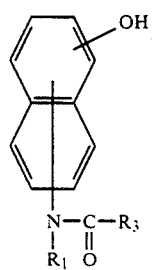

(IV-f)

wherein $R_1$ and $R_3$ represent the same as defined above in relation to the formulae (IV-c) and (IV-e);

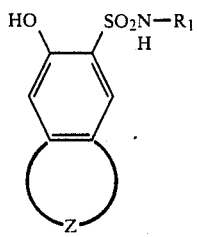

wherein $R_1$ and Z represent the same as defined above in relation to the formulae (IV-c) and (IV-b);

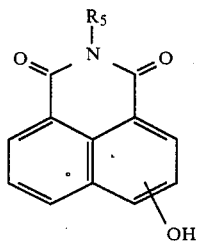

wherein $R_5$ represents alkyl group which may have a substituent, alkenyl group which may have a substituent, alkynyl group which may have a substituent, or aryl group;

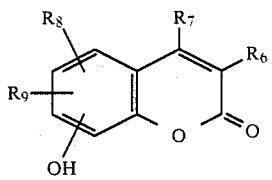

wherein $R_6$, $R_7$, $R_8$ and $R_9$ represent independently hydrogen atom, halogen atom, alkyl group which may have a substituent, vinyl group which may have a substituent, substituted amino group or aryl group, and $R_6$ may represent, beside the above,

wherein $R_{10}$ represents alkyl group which may have a substituent, aryl group, heterocyclic group, vinyl group which may have a substituent, amino group which may have a substituent or alkoxy group which may have a substituent.

4. The photoreceptor according to claim 1, wherein said divalent group of D is a divalent group derived from a compound selected from the group consisting of aromatic hydrocarbons, aromatic heterocyclic compound, directly bonded compounds of said aromatic hydrocarbons and/or said aromatic heterocyclic compounds, condensed compounds of said aromatic hydrocarbons and/or said aromatic heterocyclic compounds, and compounds formed by combining aromatic hydrocarbons, alicyclic hydrocarbons or heterocyclic compounds through a bonding group.

* * * * *

UNITED STATES PATENT AND TRADEMARK OFFICE
CERTIFICATE OF CORRECTION

PATENT NO. : 4,921,770

DATED : 05/01/90

INVENTOR(S) : Tetsuo Murayama and Shinji Aramaki

It is certified that error appears in the above-identified patent and that said Letters Patent is hereby corrected as shown below:

Title page:

--[73] Assignee: Mitsubishi Kasei Corporation, Tokyo, Japan.--

Signed and Sealed this

Twenty-fourth Day of December, 1991

Attest:

HARRY F. MANBECK, JR.

*Attesting Officer*    *Commissioner of Patents and Trademarks*